(12) United States Patent
Kozubal et al.

(10) Patent No.: US 9,140,471 B2
(45) Date of Patent: Sep. 22, 2015

(54) INDIRECT EVAPORATIVE COOLERS WITH ENHANCED HEAT TRANSFER

(71) Applicant: ALLIANCE FOR SUSTAINABLE ENERGY, LLC, Golden, CO (US)

(72) Inventors: Eric Kozubal, Superior, CO (US); Jason Woods, Boulder, CO (US); Ron Judkoff, Golden, CO (US)

(73) Assignee: Alliance For Sustainable Energy, LLC, Golden, CO (US)

( * ) Notice: Subject to any disclaimer, the term of this patent is extended or adjusted under 35 U.S.C. 154(b) by 224 days.

(21) Appl. No.: 13/801,395

(22) Filed: Mar. 13, 2013

(65) Prior Publication Data
US 2014/0260398 A1    Sep. 18, 2014

(51) Int. Cl.
| | |
|---|---|
| *F25B 15/00* | (2006.01) |
| *F24F 6/02* | (2006.01) |
| *F24F 12/00* | (2006.01) |
| *F28D 5/00* | (2006.01) |
| *F28D 21/00* | (2006.01) |

(52) U.S. Cl.
CPC . *F25B 15/00* (2013.01); *F24F 6/02* (2013.01); *F24F 12/006* (2013.01); *F28D 5/00* (2013.01); *F28D 21/0014* (2013.01); *F28D 21/0015* (2013.01); *Y02B 30/62* (2013.01)

(58) Field of Classification Search
CPC .......... F25B 15/00; F25B 17/00; F25B 27/00; F25B 29/006; F25B 49/04; F25B 39/026
USPC ............... 62/94, 171, 271, 304, 314
See application file for complete search history.

(56) References Cited

U.S. PATENT DOCUMENTS

| | | | |
|---|---|---|---|
| 4,224,927 A | * | 9/1980 | Patil .............................. 126/675 |
| 4,263,967 A | | 4/1981 | McNab et al. |

(Continued)

FOREIGN PATENT DOCUMENTS

| | | |
|---|---|---|
| CN | 1044527 | 8/1990 |
| CN | 1918435 | 2/2007 |

(Continued)

OTHER PUBLICATIONS

Woods, J. et al, "A desiccant-enhanced evaporative air conditioner: Numerical model and experiments," Energy Conversion and Management, 65, SI, pp. 208-220, Jan. 2013.

(Continued)

*Primary Examiner* — Mohammad M Ali
(74) *Attorney, Agent, or Firm* — John C. Stolpa

(57) ABSTRACT

A separator plate assembly for use in an indirect evaporative cooler (IEC) with an air-to-air heat exchanger. The assembly includes a separator plate with a first surface defining a dry channel and a second surface defining a wet channel. The assembly includes heat transfer enhancements provided on the first surface for increasing heat transfer rates. The heat transfer enhancements may include slit fins with bodies extending outward from the first surface of separator plate or may take other forms including vortex generators, offset strip fins, and wavy fins. In slit fin implementations, the separator plate has holes proximate to each of the slit fins, and the separator plate assembly may include a sealing layer applied to the second surface of the separator plate to block air flow through the holes. The sealing layer can be a thickness of adhesive, and a layer of wicking material is applied to the adhesive.

21 Claims, 26 Drawing Sheets

(56) References Cited

U.S. PATENT DOCUMENTS

| | | | |
|---|---|---|---|
| 4,419,835 A * | 12/1983 | Strain | 34/80 |
| 4,544,513 A | 10/1985 | Otterbein | |
| 4,827,733 A | 5/1989 | Dinh | |
| 4,976,113 A | 12/1990 | Gershuni et al. | |
| 5,351,497 A | 10/1994 | Lowenstein | |
| 5,390,505 A | 2/1995 | Smith et al. | |
| 5,493,871 A | 2/1996 | Eiermann | |
| 5,638,900 A | 6/1997 | Lowenstein | |
| 5,860,284 A | 1/1999 | Goland et al. | |
| 5,860,285 A | 1/1999 | Tulpule | |
| 6,178,762 B1 | 1/2001 | Flax | |
| 6,216,483 B1 | 4/2001 | Potnis et al. | |
| 6,247,604 B1 | 6/2001 | Taskis et al. | |
| 6,494,053 B1 | 12/2002 | Forkosh et al. | |
| 6,497,107 B2 | 12/2002 | Maisotsenko | |
| 6,514,321 B1 | 2/2003 | Lehto et al. | |
| 6,539,731 B2 | 4/2003 | Kesten et al. | |
| 6,634,165 B2 | 10/2003 | Tomlinson et al. | |
| 6,684,649 B1 | 2/2004 | Thompson | |
| 6,731,523 B2 | 5/2004 | Jitaru | |
| 6,739,142 B2 | 5/2004 | Korin | |
| 6,841,601 B2 | 1/2005 | Serpico et al. | |
| 6,854,278 B2 | 2/2005 | Maisotsenko et al. | |
| 7,197,887 B2 | 4/2007 | Maisotsenko et al. | |
| 7,758,671 B2 | 7/2010 | Kesten et al. | |
| 7,987,682 B2 | 8/2011 | Reinders et al. | |
| 8,769,971 B2 | 7/2014 | Kozubal et al. | |
| 2002/0038552 A1 | 4/2002 | Maisotsenko et al. | |
| 2003/0014983 A1 | 1/2003 | Maisotsenko et al. | |
| 2003/0033821 A1 | 2/2003 | Maisotsenko et al. | |
| 2003/0106680 A1 | 6/2003 | Serpico et al. | |
| 2004/0031282 A1 | 2/2004 | Kopko | |
| 2004/0061245 A1 | 4/2004 | Maisotsenko et al. | |
| 2004/0112077 A1* | 6/2004 | Forkosh et al. | 62/271 |
| 2004/0134212 A1 | 7/2004 | Lee et al. | |
| 2005/0109052 A1 | 5/2005 | Albers et al. | |
| 2005/0210907 A1 | 9/2005 | Gillian et al. | |
| 2005/0215728 A1 | 9/2005 | Cao et al. | |
| 2005/0252229 A1 | 11/2005 | Moratalla | |
| 2007/0017235 A1 | 1/2007 | Cai et al. | |
| 2007/0056309 A1 | 3/2007 | Bhatti et al. | |
| 2007/0101746 A1 | 5/2007 | Schlom et al. | |
| 2009/0075581 A1* | 3/2009 | Van Heeswijk et al. | 454/239 |
| 2010/0000247 A1 | 1/2010 | Bhatti et al. | |
| 2010/0031817 A1 | 2/2010 | Ehrenberg et al. | |
| 2010/0048942 A1 | 2/2010 | Knoesche et al. | |
| 2010/0092888 A1 | 4/2010 | Buchine et al. | |
| 2010/0273901 A1 | 10/2010 | Ehrenberg et al. | |
| 2010/0319370 A1* | 12/2010 | Kozubal et al. | 62/92 |
| 2011/0108406 A1 | 5/2011 | Maisotsenko et al. | |
| 2011/0120685 A1 | 5/2011 | van Heeswijk et al. | |
| 2011/0195652 A1 | 8/2011 | Smith | |
| 2011/0209858 A1 | 9/2011 | Konno | |
| 2012/0125020 A1 | 5/2012 | Vandermeulen et al. | |
| 2012/0125021 A1 | 5/2012 | Vandermeulen et al. | |
| 2012/0125031 A1 | 5/2012 | Vandermeulen et al. | |
| 2012/0125405 A1 | 5/2012 | Vandermeulen et al. | |
| 2012/0125581 A1 | 5/2012 | Allen et al. | |
| 2012/0131934 A1 | 5/2012 | Vandermeulen et al. | |
| 2012/0131937 A1 | 5/2012 | Vandermeulen et al. | |
| 2012/0131938 A1 | 5/2012 | Vandermeulen et al. | |
| 2012/0131939 A1 | 5/2012 | Vandermeulen et al. | |
| 2012/0131940 A1 | 5/2012 | Vandermeulen et al. | |
| 2012/0132513 A1 | 5/2012 | Vandermeulen et al. | |
| 2012/0167600 A1 | 7/2012 | Dunnavant | |
| 2012/0186281 A1 | 7/2012 | Vandermeulen et al. | |
| 2013/0010423 A1 | 1/2013 | Carlson | |
| 2013/0340449 A1 | 12/2013 | Kozubal et al. | |

FOREIGN PATENT DOCUMENTS

| | | |
|---|---|---|
| JP | 59-066692 | 4/1984 |
| JP | 1099631 | 4/1989 |
| JP | 2002206834 | 7/2002 |
| JP | 2007147116 | 6/2007 |
| JP | 2007147117 | 6/2007 |
| WO | WO 8706682 | 11/1987 |
| WO | WO 02080295 | 10/2002 |
| WO | WO 2005080881 | 9/2005 |
| WO | WO 2009094032 | 7/2009 |
| WO | WO 2011016847 | 2/2011 |
| WO | WO 2011161547 | 12/2011 |
| WO | WO 2012047938 | 4/2012 |

OTHER PUBLICATIONS

Kozubal et al., "Desiccant Enhanced Evaporative Air-Conditioning (DEVap); Evaluation of a New Concept in Ultra Efficient Air Conditioning," NREL/TP5500-49722, Jan. 2011.

Kozubal et al., "Development and Analysis of Desiccant Enhanced Evaporative Air Conditioner Prototype," NREL/TP-550-54755, Apr. 2012.

Conde-Petit et al., "Open Absorption System for Cooling and Air Conditioning Using Membrane Contactors—Final Report," Publication 280139, Jul. 8, 2008.

Conde-Petit, et al., "Open Air Absorption System for Cooling and Air Conditioning Using Membrane Contactors—Annual Report 2005," Publication 260097, Jan. 30, 2006.

Conde-Petit, "Liquid Desiccant-Based Air-Conditioning Systems," LDACS, Proc. of the 1st European Conference on Polygeneration—Technologies and Applications, pp. 217-234, A. Coronas, ed., Oct. 16-17, 2007, Spain.

Conde-Petit, "Open Absorption System for Cooling and Air Conditioning Using Membrane Contactors," Proceedings, '15, Schweizerisches Status-Seminar <<Energie-und Umweltforschung im Bauwesen>>, Sep. 11-12, 2008, Switzerland.

El-Dessouky et al., "A novel air conditioning system: Membrane air drying and evaporative cooling," IchemE., Chemical Research and Design, vol. 78, Issue 7, pp. 999-1009, Oct. 2000.

Al-Sulaiman et al, "Liquid Desiccant based two-stage evaporative cooling system using reverse osmosis (RO) process for regeneration," Applied Thermal Engineering, vol. 27, Issues 14-15, pp. 2449-2452, Oct. 2007.

International Search Report, dated Sep. 25, 2008, for International Application PCT/US08/52016.

International Preliminary Report on Patentability and Written Opinion, dated Jul. 27, 2010, for International Application PCT/US08/52016.

Conde-Petit, et al., "Open Absorption System for Cooling and Air Conditioning Using Membrane Contactors" Publication 260098, Nov. 14, 2006.

International Search Report, dated Nov. 13, 2013, for International Application PCT/US13/46762.

International Preliminary Report on Patentability and Written Opinion, dated Dec. 23, 2013, for International Application PCT/US13/46762.

* cited by examiner

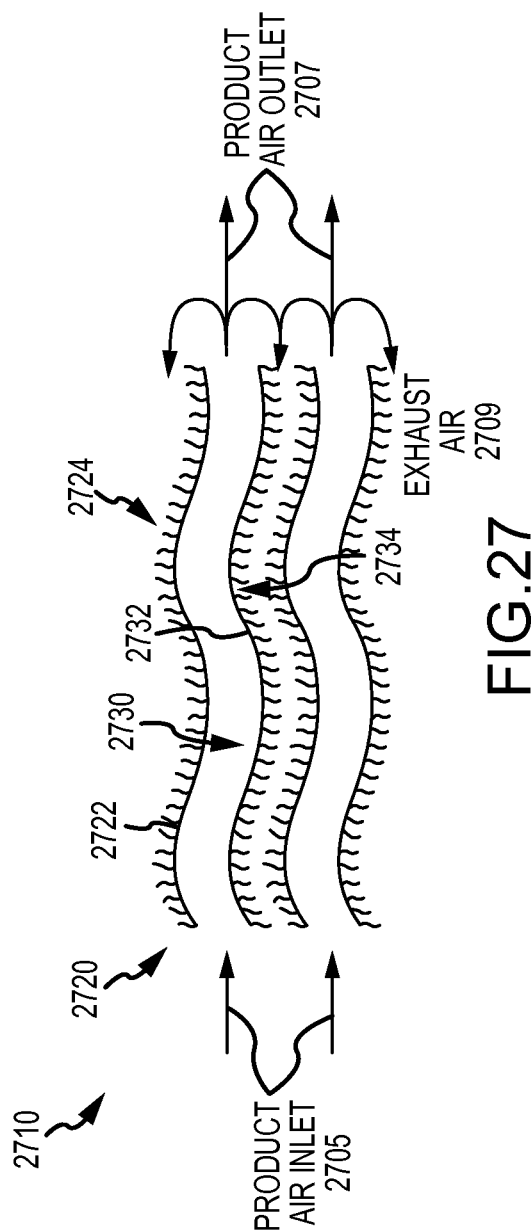

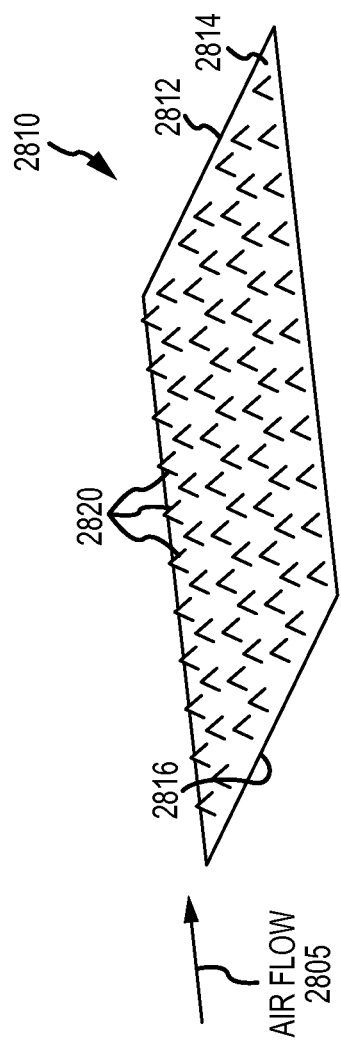

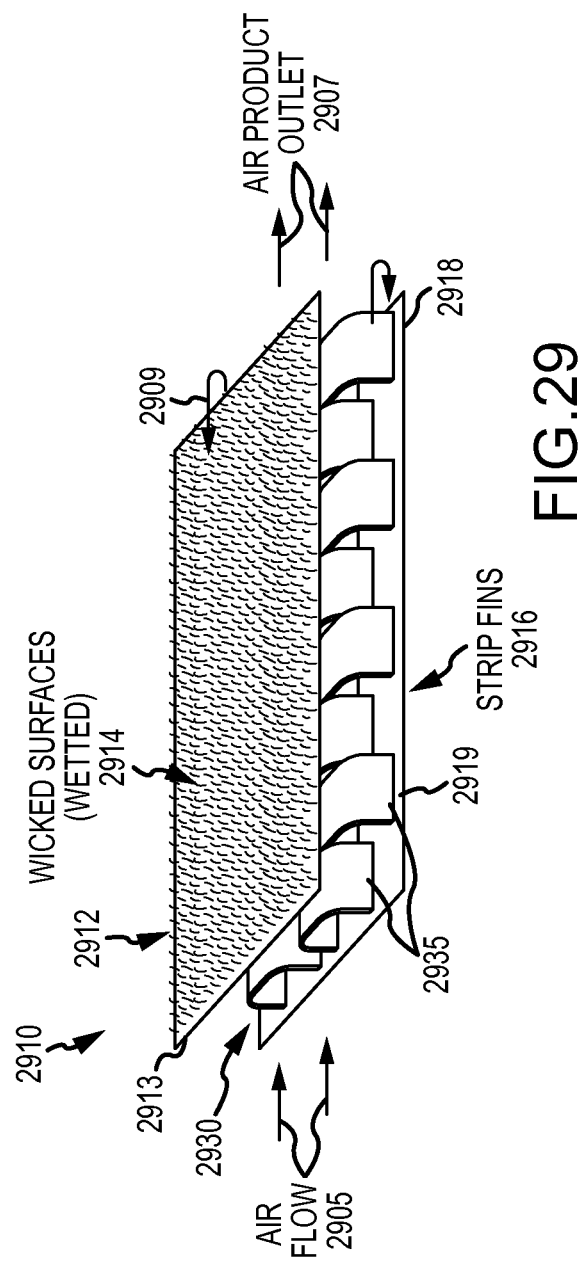

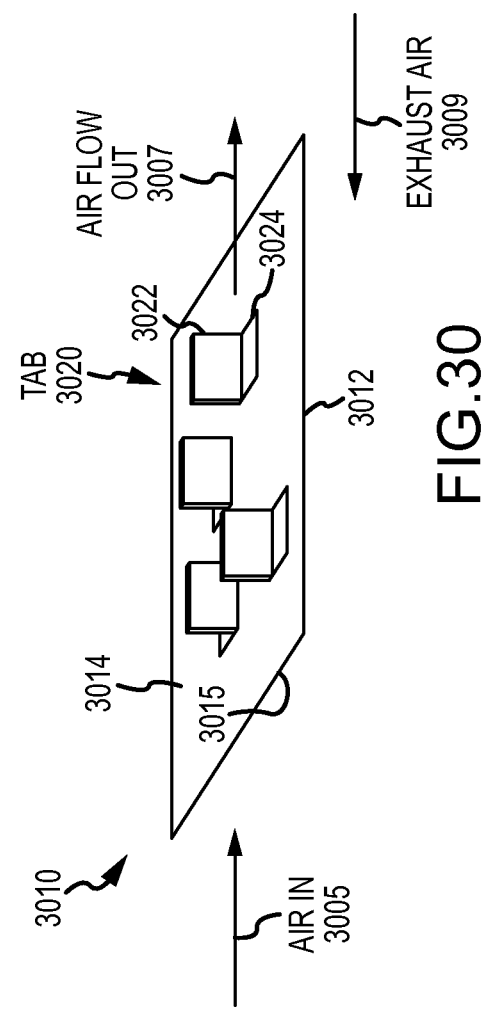

INDIRECT EVAPORATIVE COOLERS WITH ENHANCED HEAT TRANSFER

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

CROSS-REFERENCE TO RELATED APPLICATIONS

This application is a continuation-in-part application of, and claims priority to an benefit of, copending U.S. application Ser. No. 12/864,071, entitled "INDIRECT EVAPORATIVE COOLER USING MEMBRANE-CONTAINED, LIQUID DESICCANT FOR DEHUMIDIFICATION" filed on Sep. 2, 2010, which is a 371 Application of International Application No. PCT/US/08/52016, entitled "INDIRECT EVAPORATIVE COOLER USING MEMBRANE-CONTAINED, LIQUID DESICCANT FOR DEHUMIDIFICATION" filed on Jan. 25, 2008, both of which are incorporated herein in their entirety.

BACKGROUND

Air conditioning is used worldwide to provide comfortable and healthy indoor environments that are properly ventilated and cooled and that have adequate humidity control. While being useful for conditioning supply air, conventional air conditioning systems are costly to operate as they use large amounts of energy (e.g., electricity). With the growing demand for energy, the cost of air conditioning is expected to increase, and there is a growing demand for more efficient air conditioning methods and technologies. Additionally, there are increasing demands for cooling technologies that do not use chemicals and materials, such as many conventional refrigerants, that may damage the environment if released or leaked. Maintenance is also a concern with many air conditioning technologies, and, as a result, any new technology that is perceived as having increased maintenance requirements, especially for residential use, will be resisted by the marketplace.

Evaporative coolers are used in some cases to address air conditioning demands or needs, but, due to a number of limitations, conventional evaporative coolers have not been widely adopted for use in commercial or residential buildings. Evaporative coolers, which are often called swamp coolers, are devices that use simple evaporation of water in air to provide cooling in contrast to conventional air conditioners that use refrigeration or absorption devices using the vapor-compression or absorption refrigeration cycles. The use of evaporative cooling has typically been limited to climates where the air is hot and humidity is low such as in the western United States. In such dry climates, the installation and operating costs of a conventional evaporative cooler can be lower than refrigerative air conditioning. Residential and industrial evaporative coolers typically use direct evaporative cooling with warm dry air being mixed with water to change the water to vapor and use the latent heat of evaporation to create cool moist air (e.g., cool air with a relative humidity of 50 to 70 percent). For example, an evaporative cooler may be provided in an enclosed metal or plastic box with vented sides containing a fan or blower, an electric motor to operate the fan, and a water pump to wet evaporative cooling pads. To provide cooling, the fan draws ambient air through vents on the unit's sides and through the dampened pads. Heat in the air evaporates water from the pads, which are continually moistened to continue the cooling process. The cooled, moist air is then delivered to the building via a vent in the roof or a wall.

While having an operation cost of about one fourth of refrigerated air conditioning, evaporative coolers have not been widely used to address needs for higher efficiency and lower cost conditioning technologies. One problem with many sump coolers is that in certain conditions these evaporative coolers cannot operate to provide adequately cooled air. For example, air may only be cooled to about 75° F. when the input air is 90° F. and 50 percent relative humidity, and such cooling may not be adequate to cool a particular space. The problem may get worse as temperatures increase such as to temperatures well over 100° F., as found in many locations in the southwest portion of the United States and elsewhere. As a result, the air conditioning system may need to include refrigerated air conditioning to cool the outlet air from the evaporative cooler, which results in a system that is more expensive to purchase, operate, and maintain.

Additionally, conventional evaporative coolers provide no dehumidification of the air and, in fact, often output air at 80 to 90 percent relative humidity, which may only be acceptable in very dry environments as very humid air reduces the rate of evaporation for occupants of the building (e.g., reduces comfort levels) and can cause condensation resulting in corrosion or other problems. Dehumidification is provided as a second or later stage in some evaporative coolers such as by wicking a liquid desiccant along a wall of the air flow channel or chamber, but such systems have not been widely adopted due to increased operating and maintenance costs and concerns of having the desiccant expelled with the conditioned air. In general, maintenance is a concern with conventional evaporative coolers as the evaporation process can result in mineral deposits on the cooling pads and other surfaces of the cooler that need to be cleaned or replaced to maintain the efficiency of the system, and the water supply line needs to be protected against freezing during the off season such as by draining the system. Due to these and other concerns, conventional evaporative cooling is unlikely to be widely used to provide an energy efficient, air conditioning alternative for commercial and residential applications until significant improvements are made that address maintenance concerns while improving achievable cooling (e.g., providing adequately cooled output air for direct use in a building).

The foregoing examples of the related art and limitations related therewith are intended to be illustrative and not exclusive. Other limitations of the related art will become apparent to those of skill in the art upon a reading of the specification and a study of the drawings.

BRIEF DESCRIPTION OF THE DETAILED DRAWINGS

Exemplary embodiments are illustrated in referenced figures of the drawings. It is intended that the embodiments and figures disclosed herein are to be considered illustrative rather than limiting.

Figure 1:
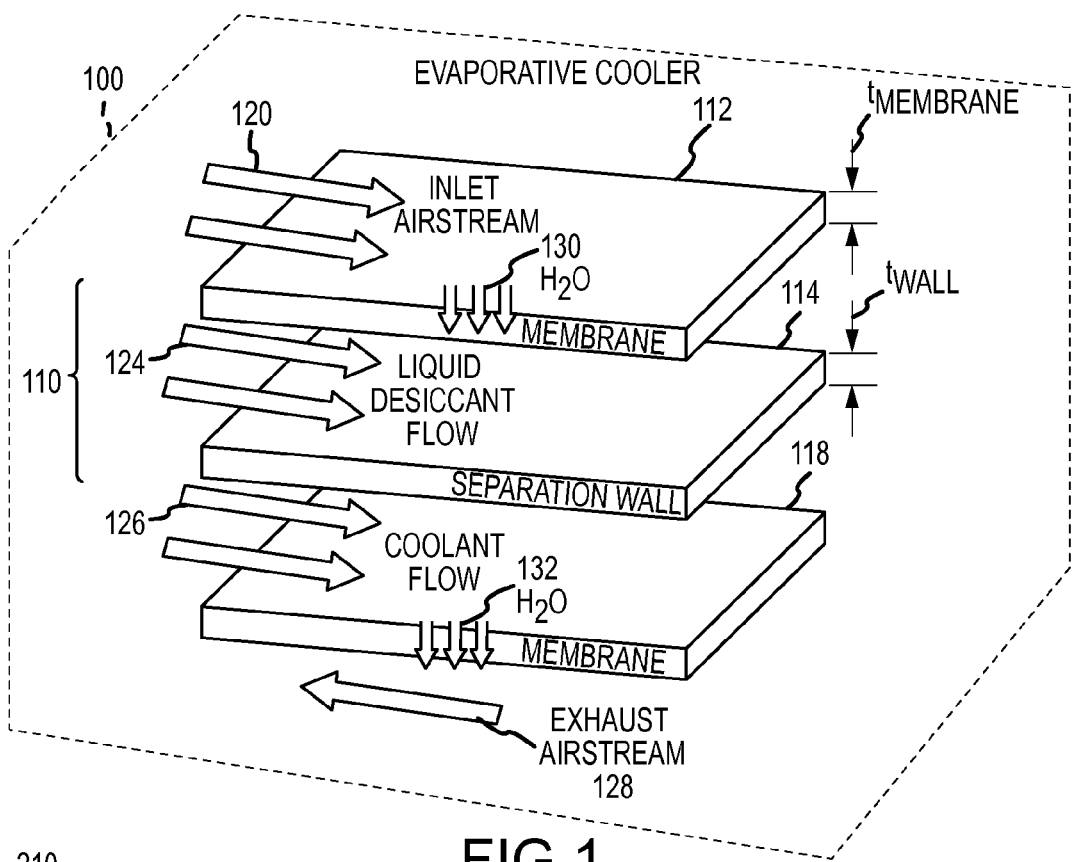
FIG. 1 illustrates in schematic form an evaporative cooler or heat exchanger including an exemplary representative of a permeable membrane stack or assembly for use in providing indirect evaporative cooling concurrently with dehumidification in an integral unit or single stage.
Figure 2:
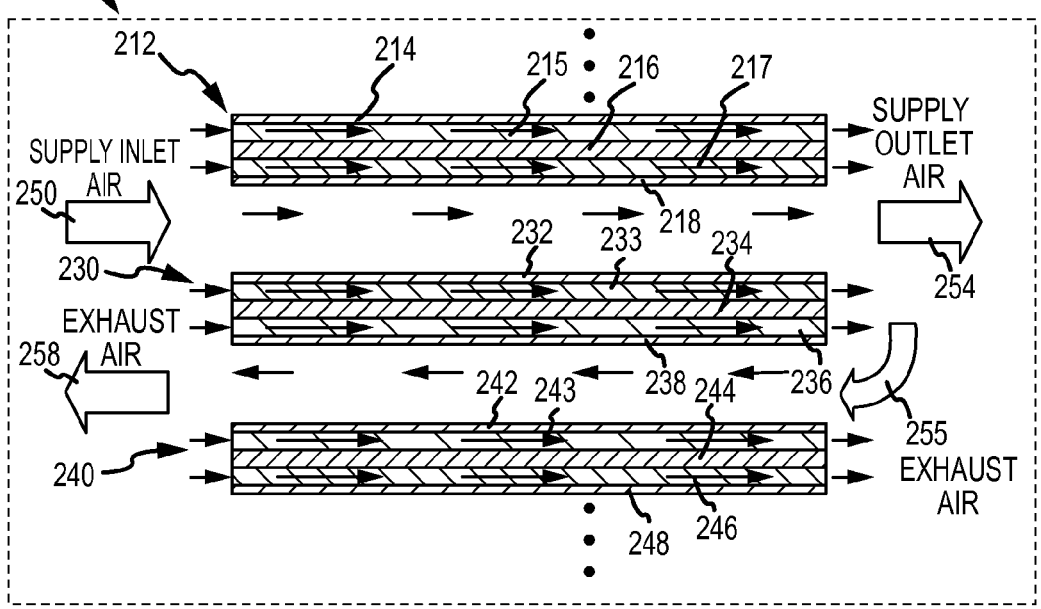
FIG. 2 illustrates another an exemplary representation of an evaporative cooler showing an assembly of membrane/wall/membrane stacks used in combination to direct the supply and exhaust airflows relative to membrane-contained liquid desiccant and coolant (e.g., cooling water) to achieve cooling and dehumidification.
Figure 3:
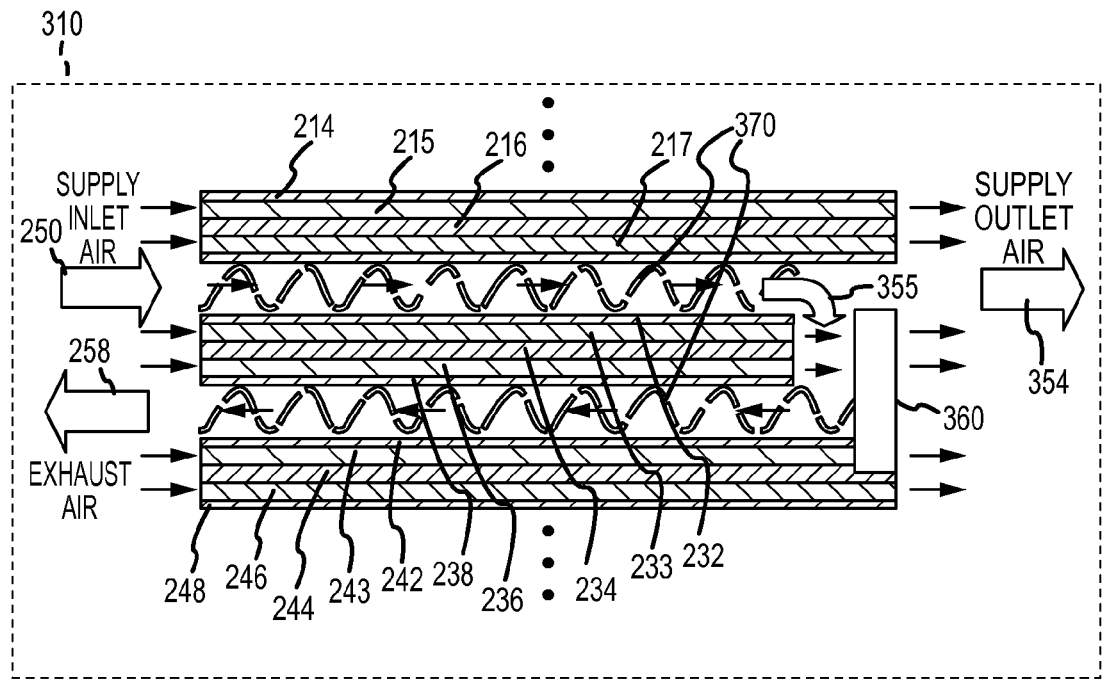
FIG. 3 illustrates an evaporative cooler similar to that shown in FIG. 2 but being configured with integral counterflow passages for exhaust/cooled air.
Figure 4:
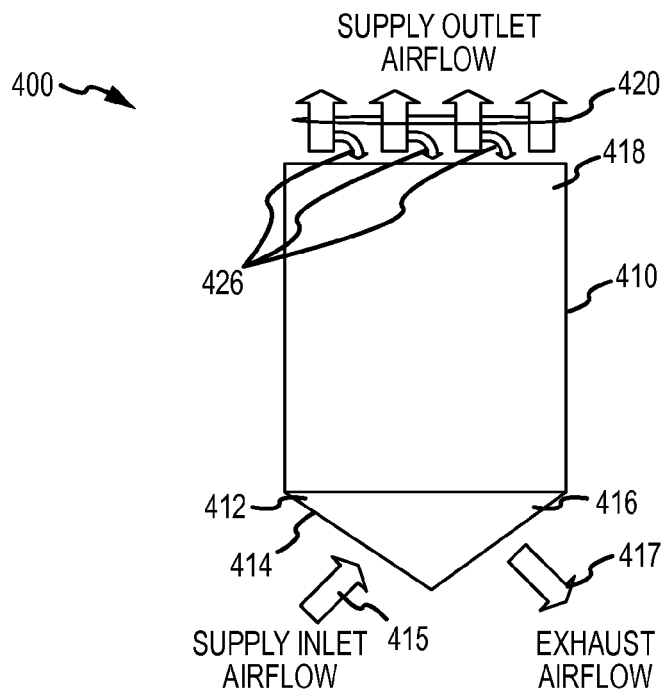
FIG. 4 is a top view of an exemplary heat exchanger illustrating air flows through a plurality of channels or chambers provided by membrane-based assemblies such as those shown in FIGS. 1-3 or other embodiments shown or described herein.
Figure 5A:
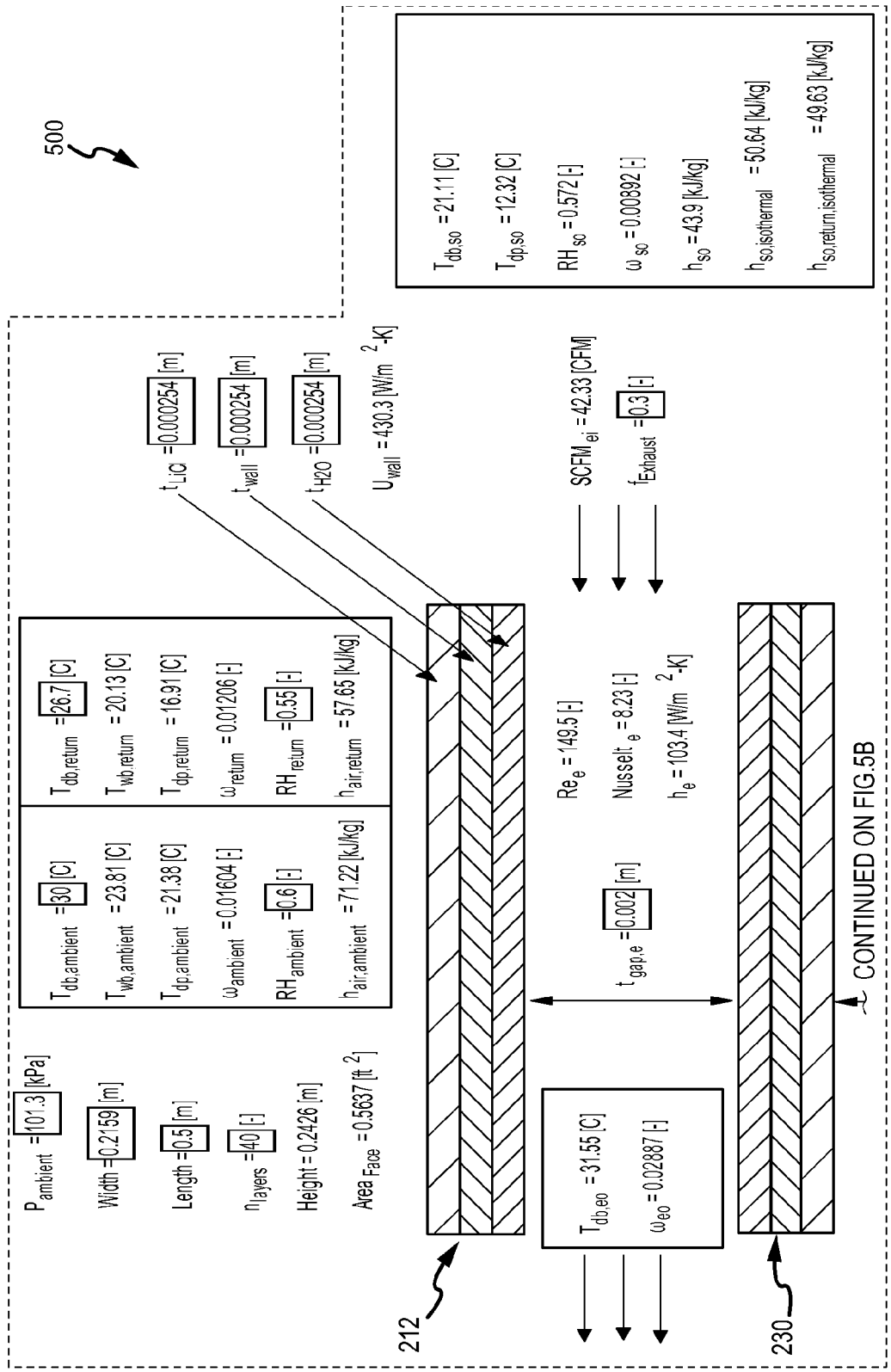
Figure 5B:
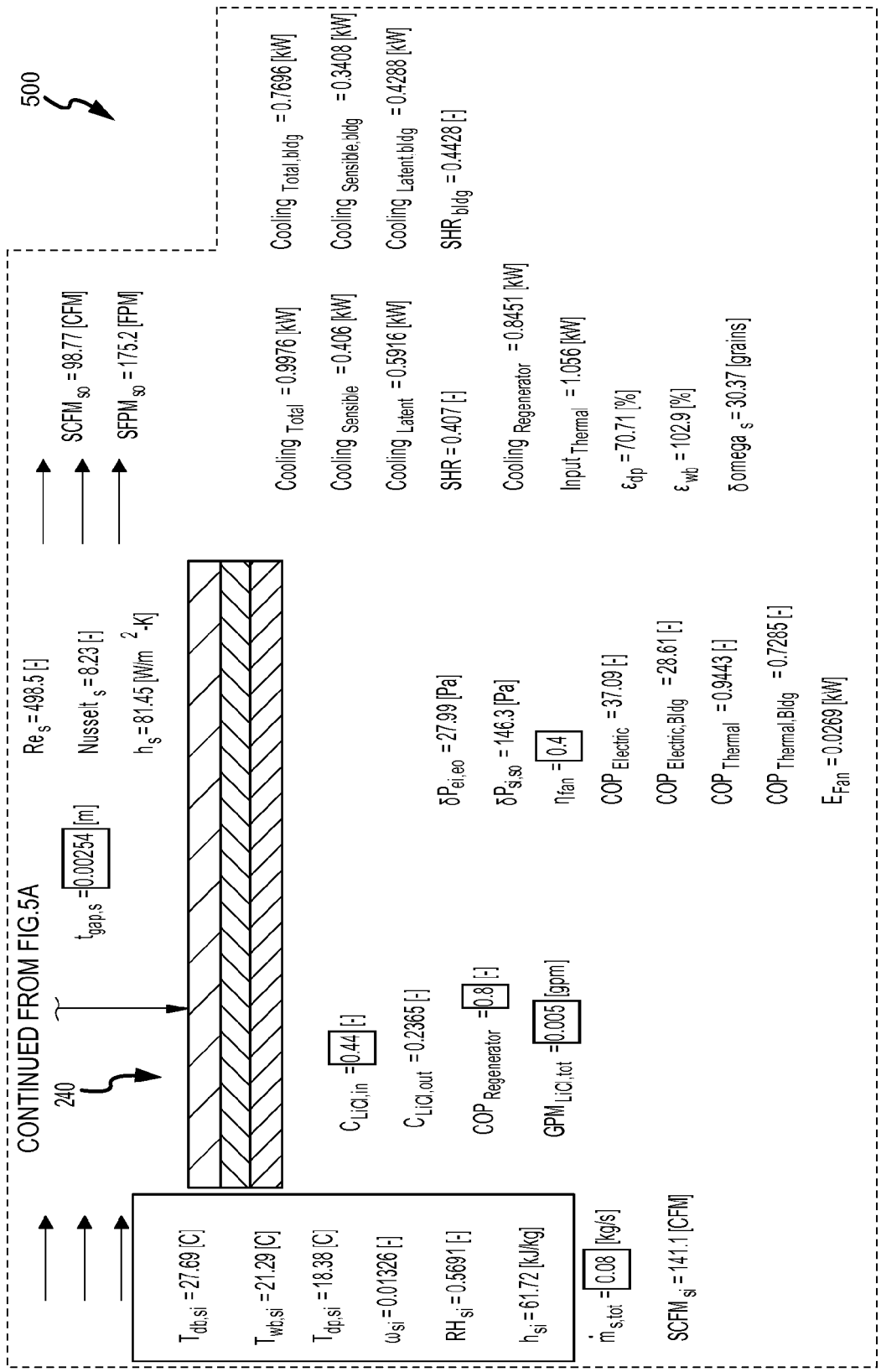
Figure 6:
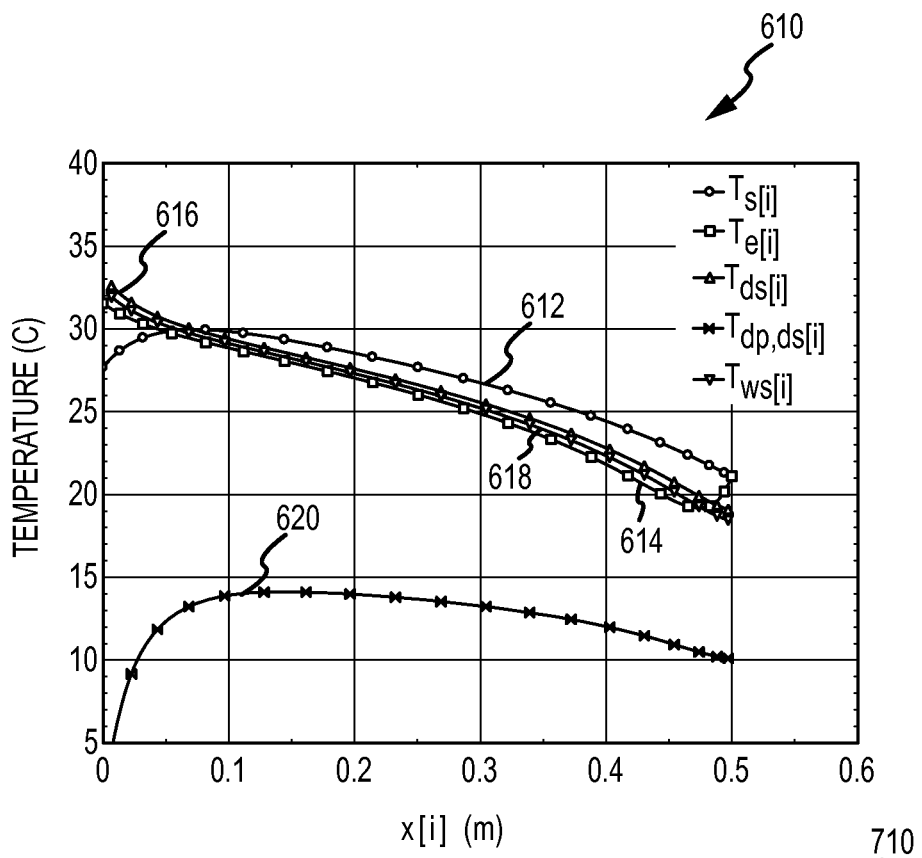
Figure 7:
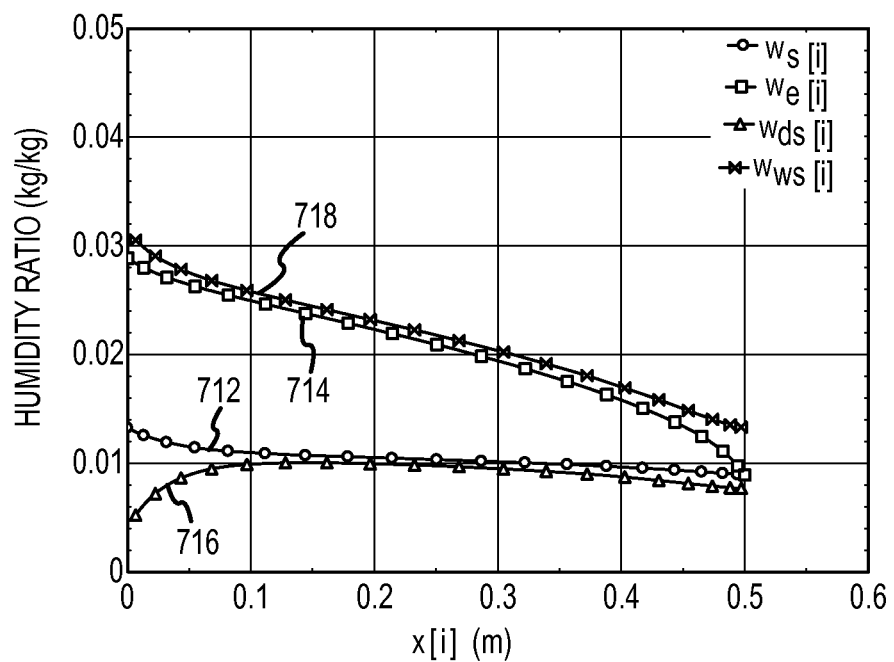
Figure 8:
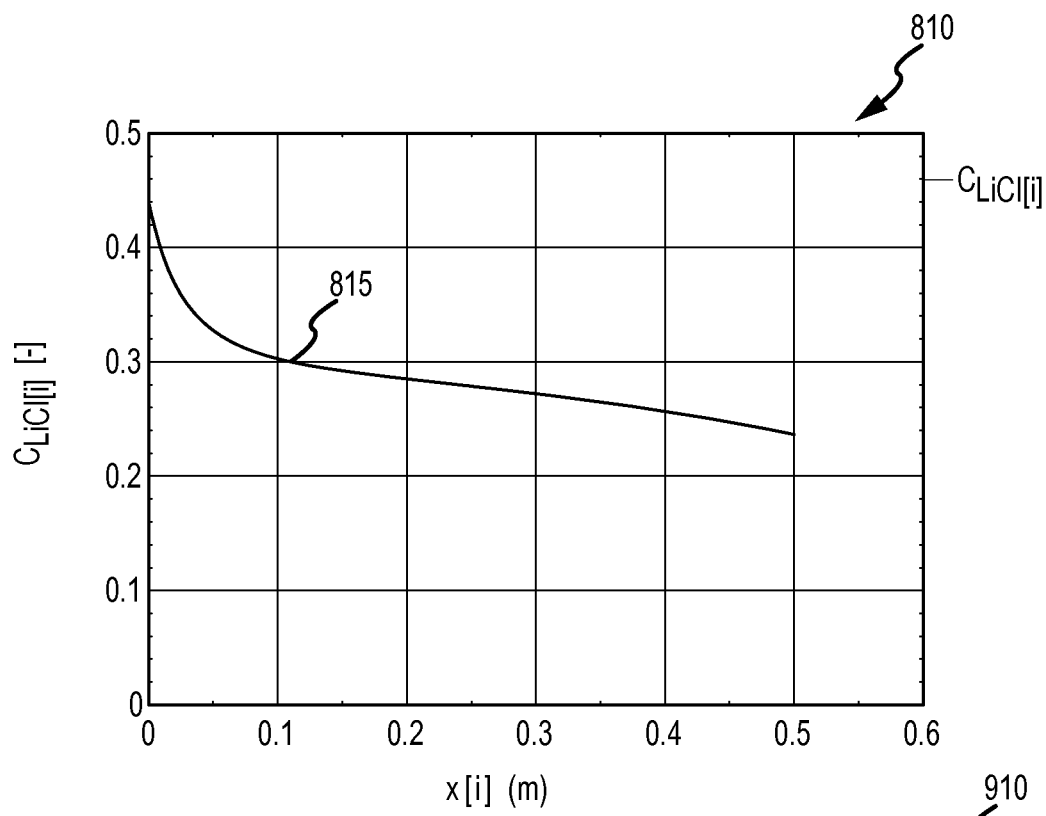
Figure 9:
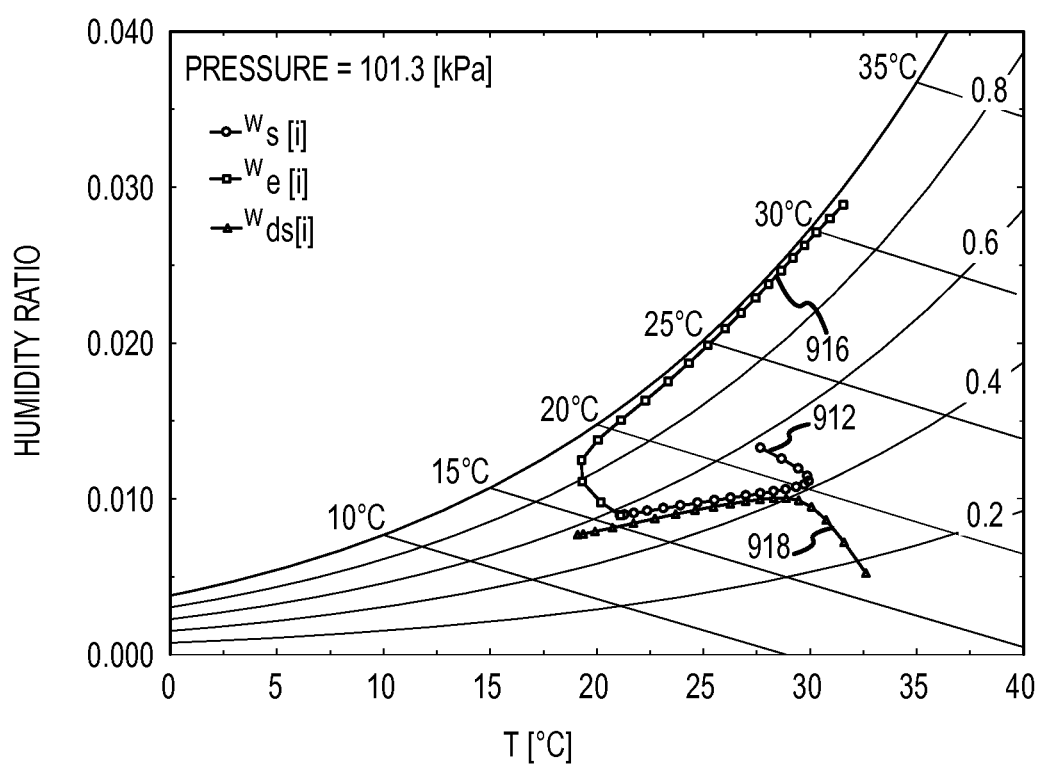
Figure 10:
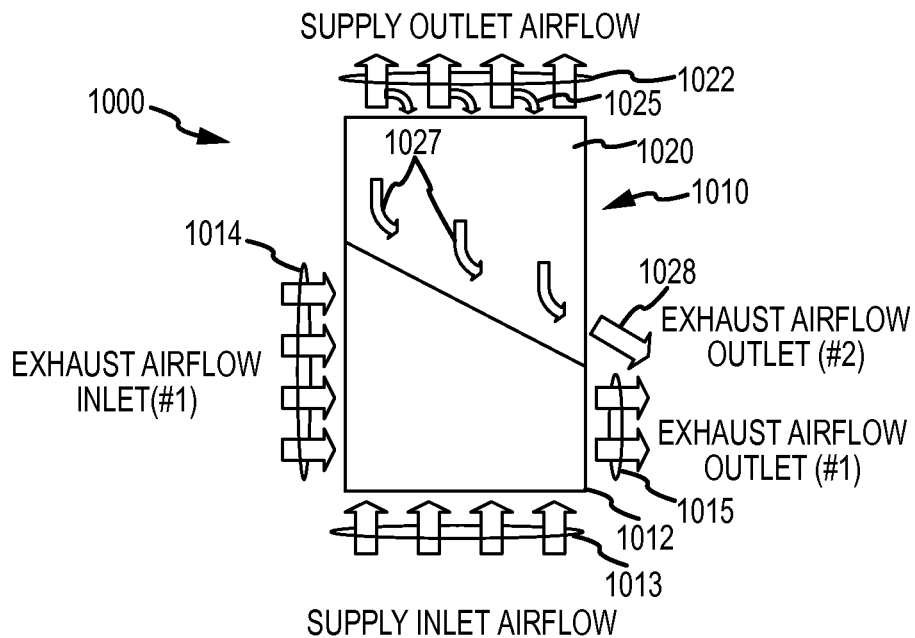
Figure 11:
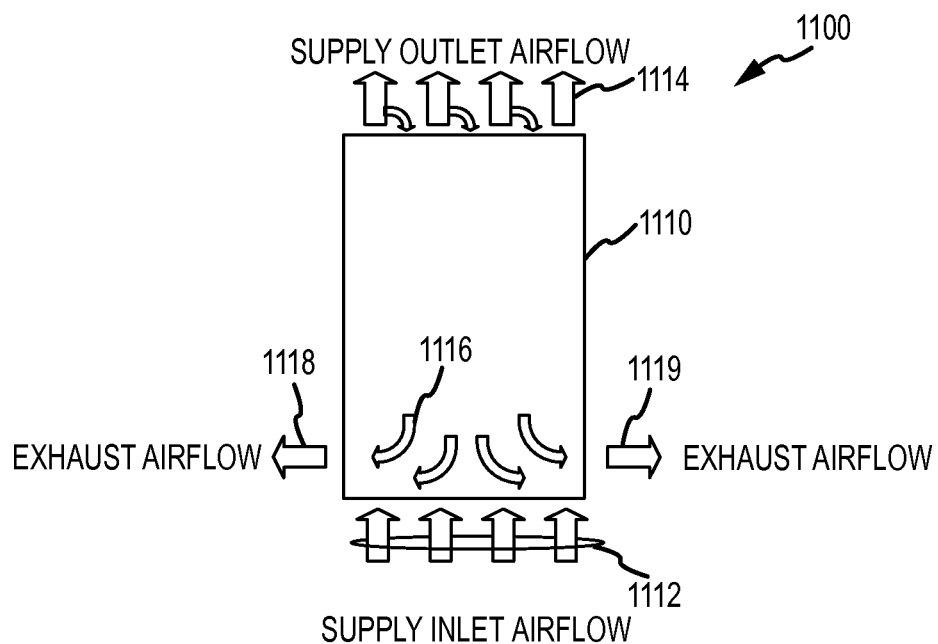
Figure 12:
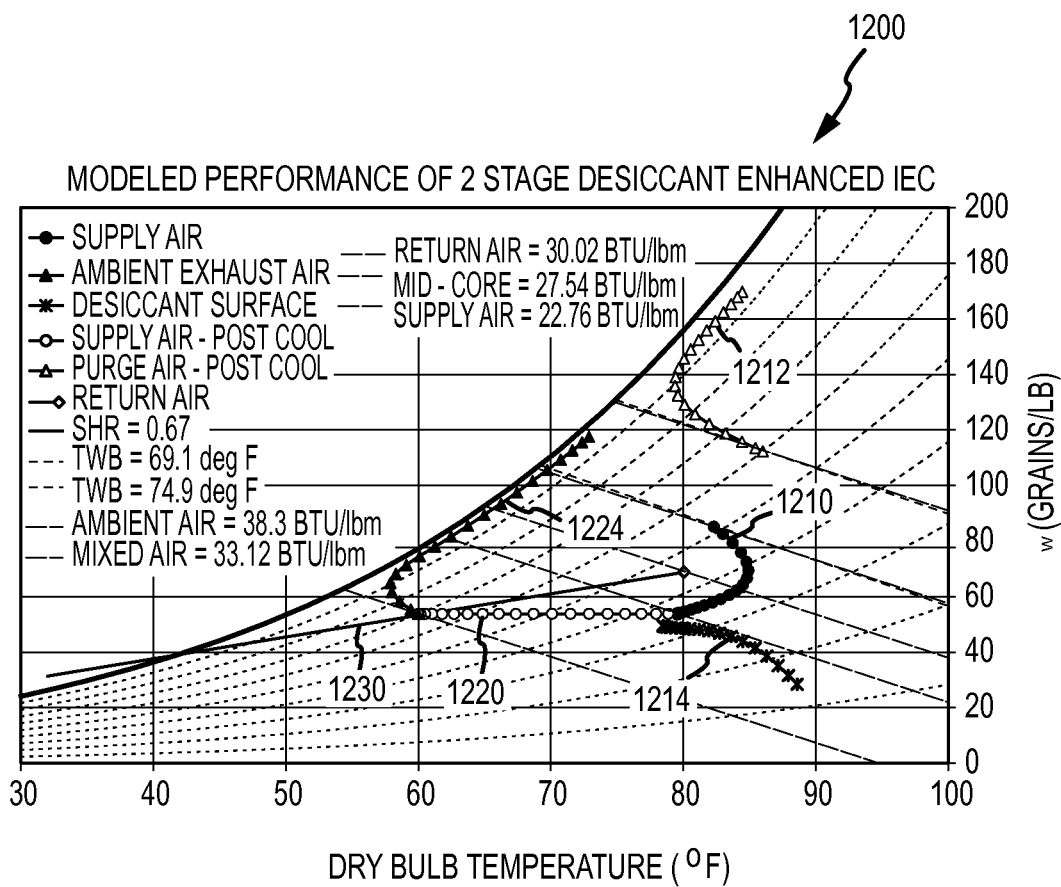
Figure 13:
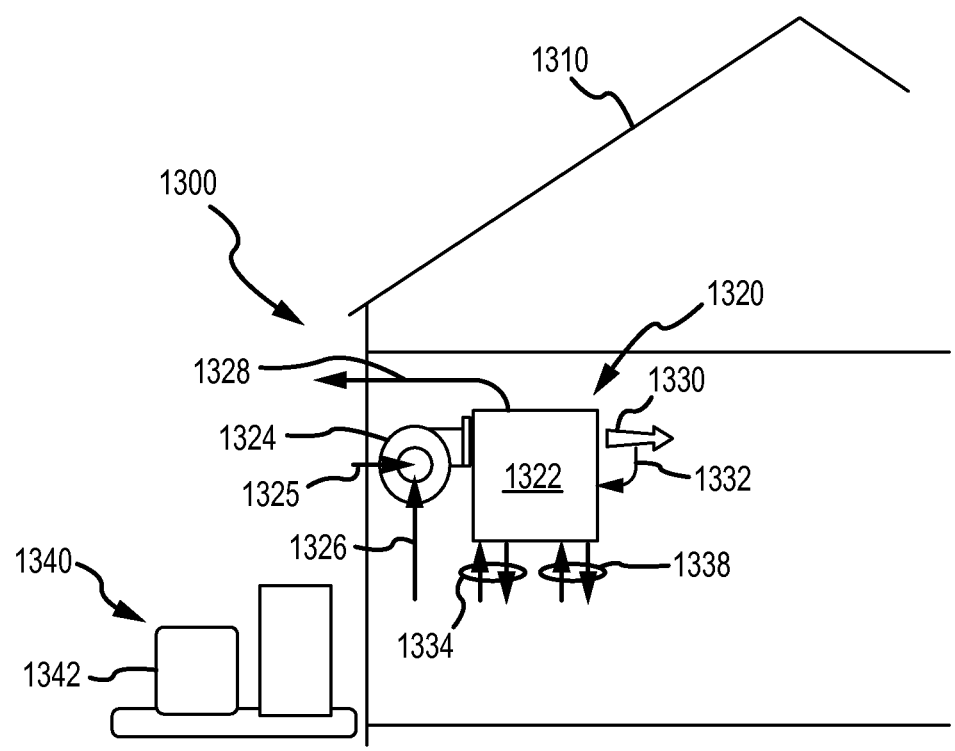
Figure 14:
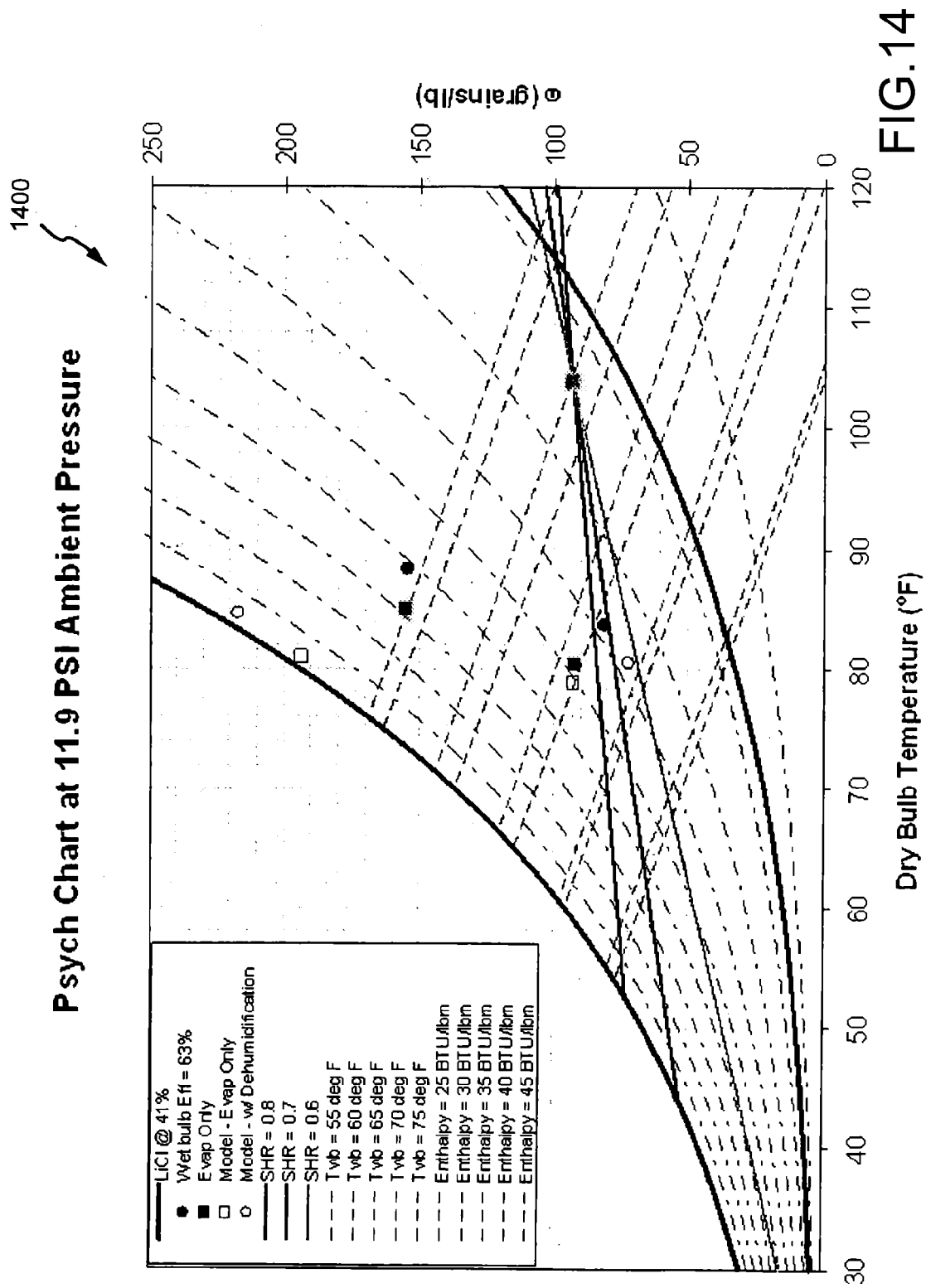
Figure 15:
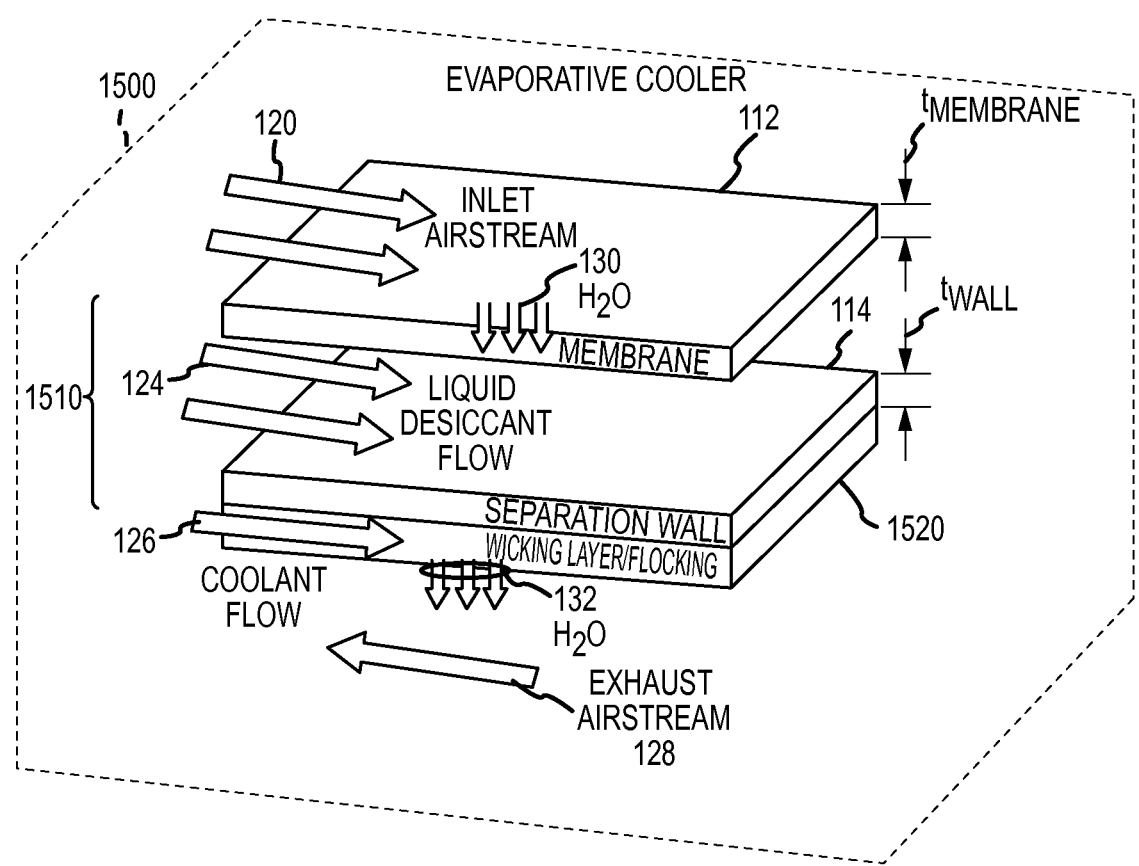
Figure 16:
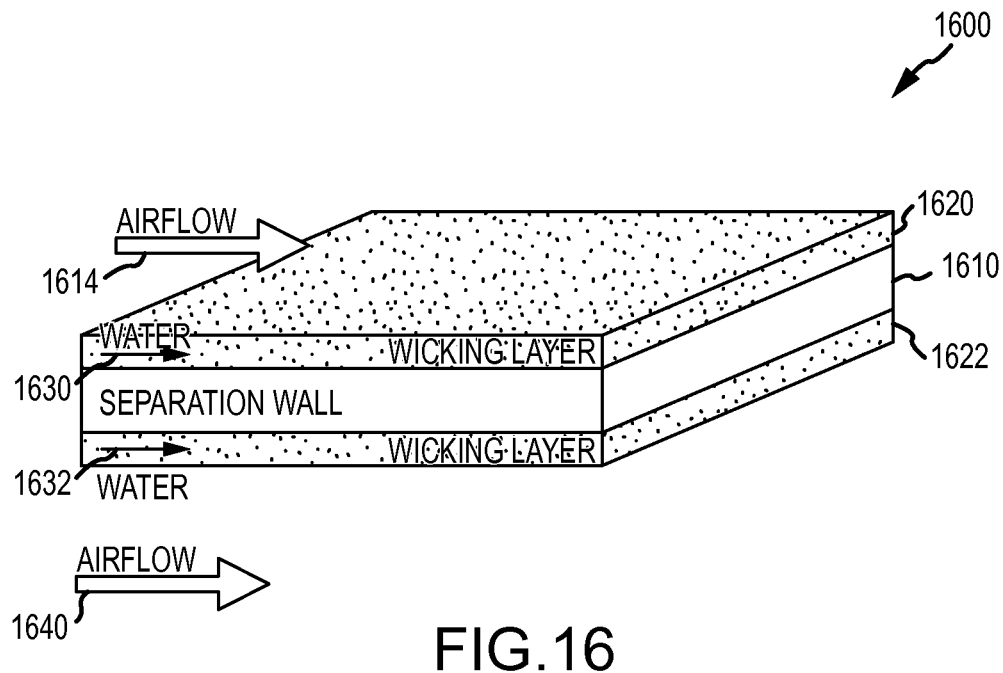
Figure 17:
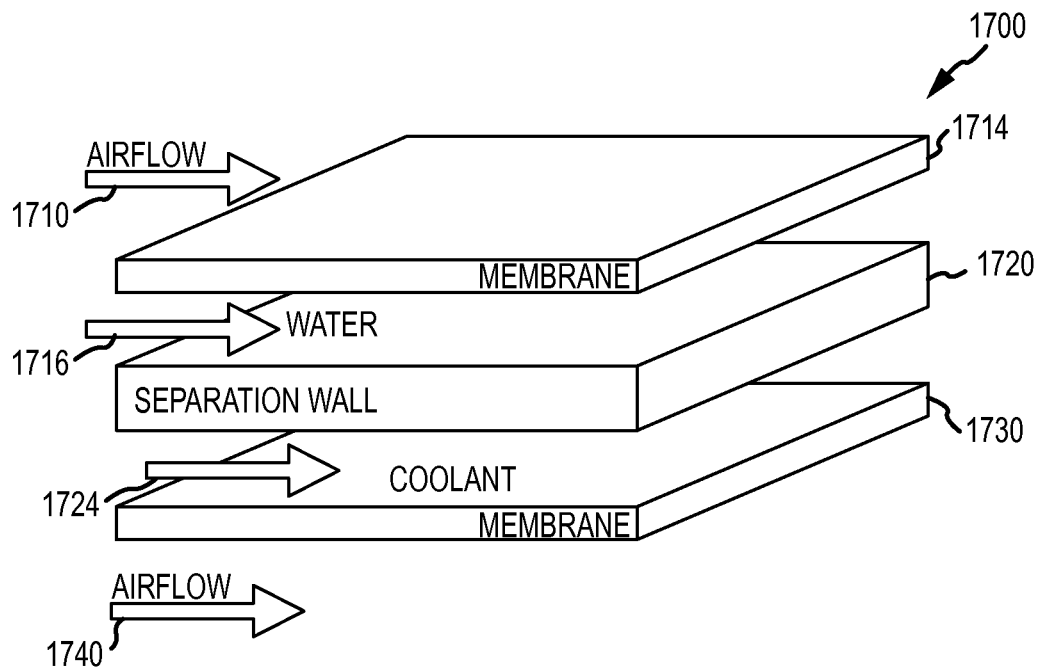
Figure 18:
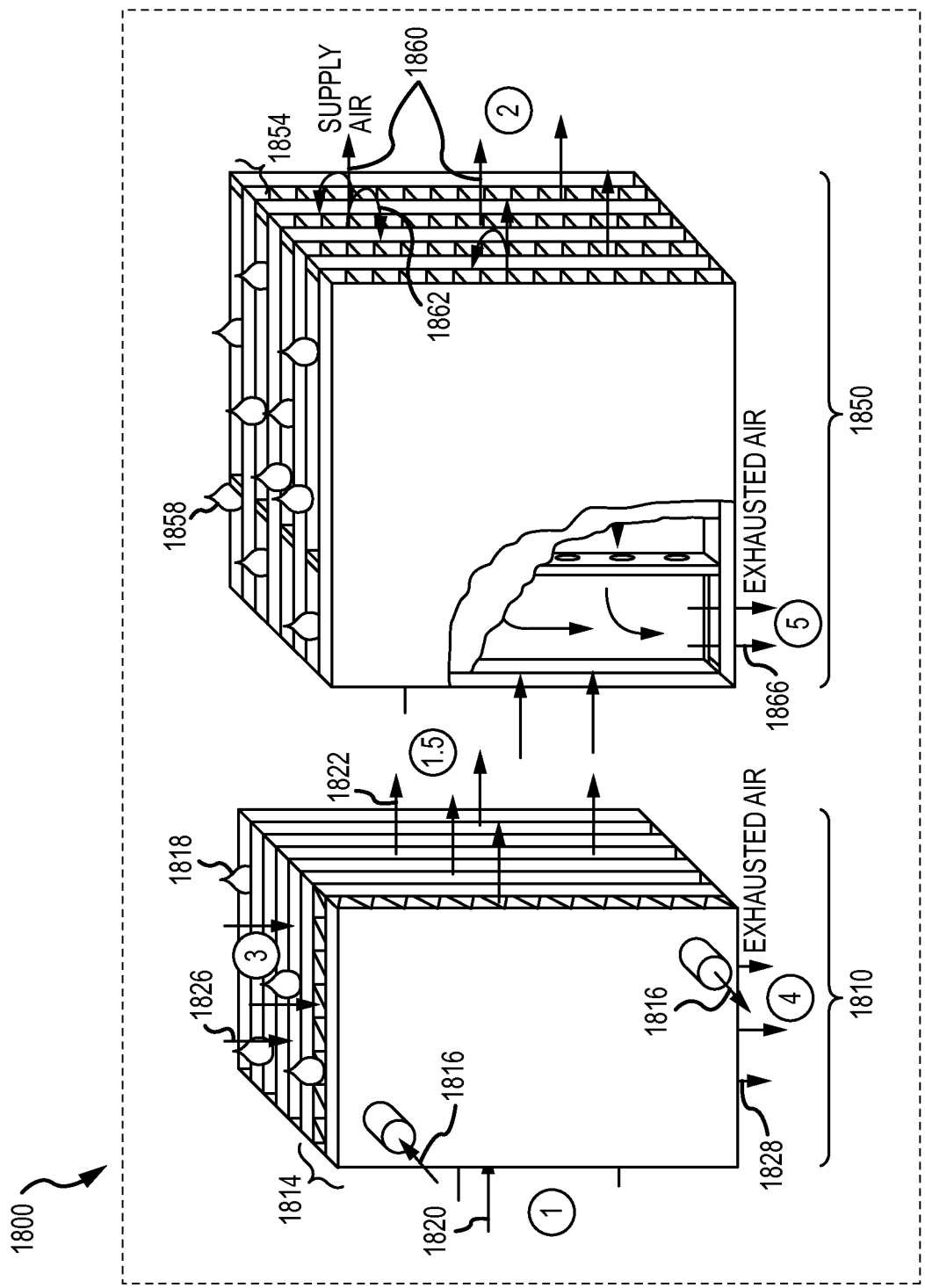
Figure 19:
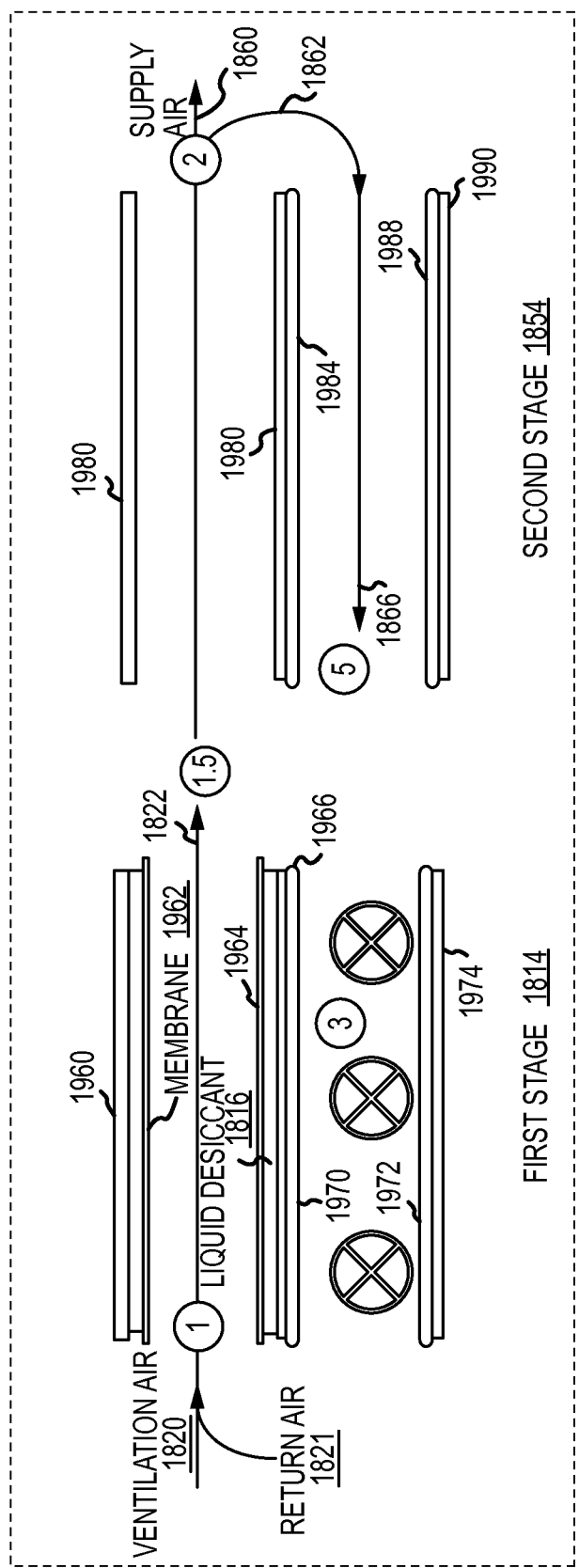
Figure 20:
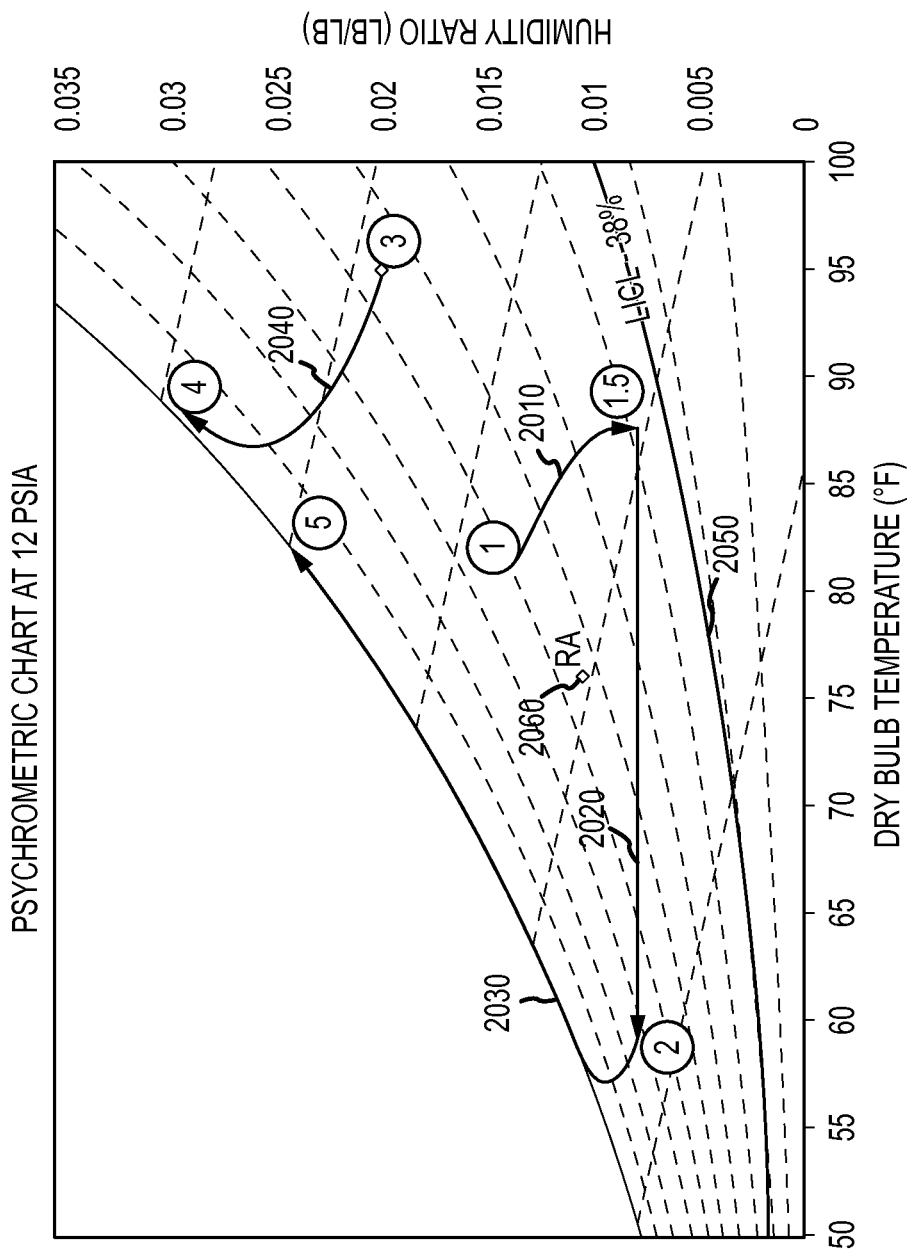
Figure 21:
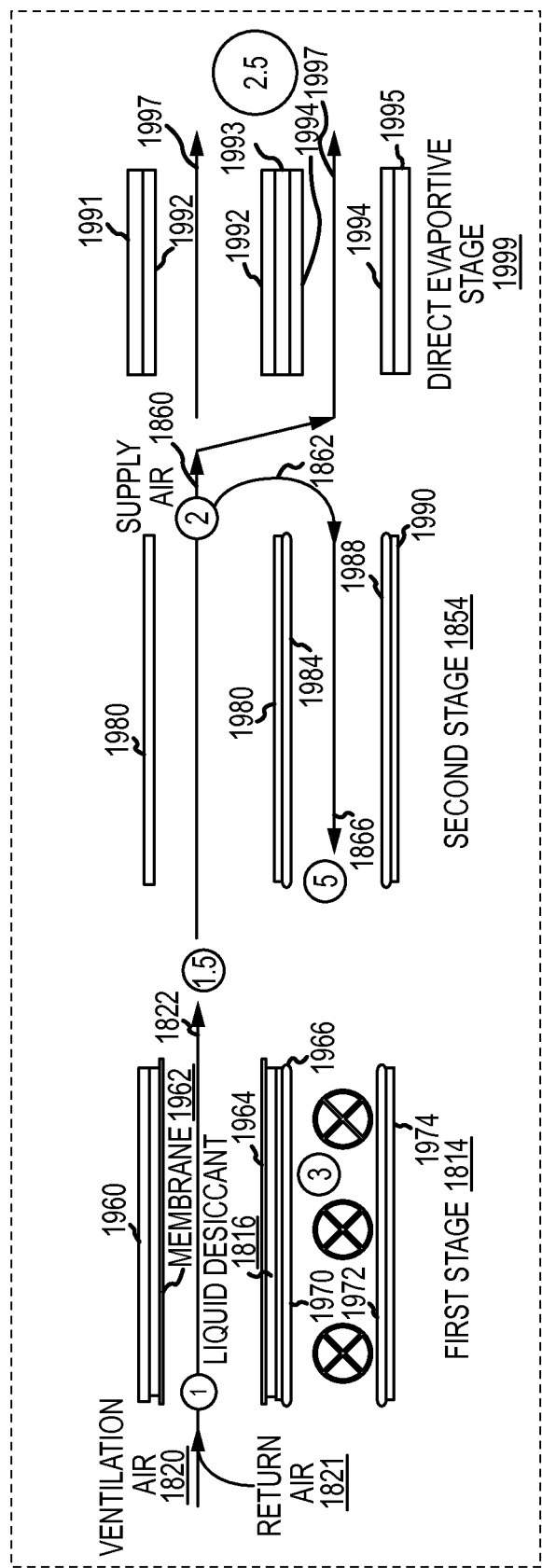
Figure 22:
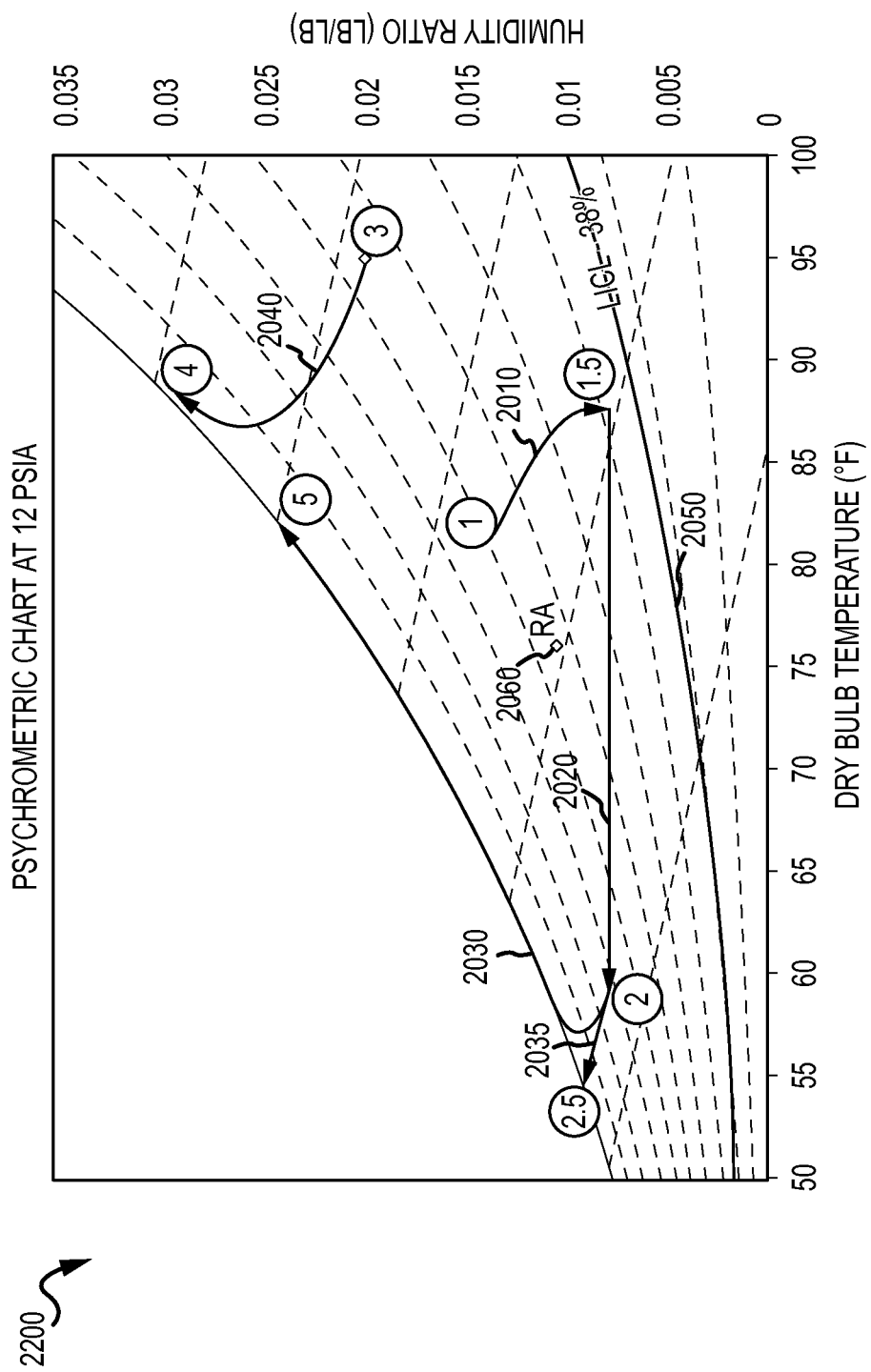
Figure 23:
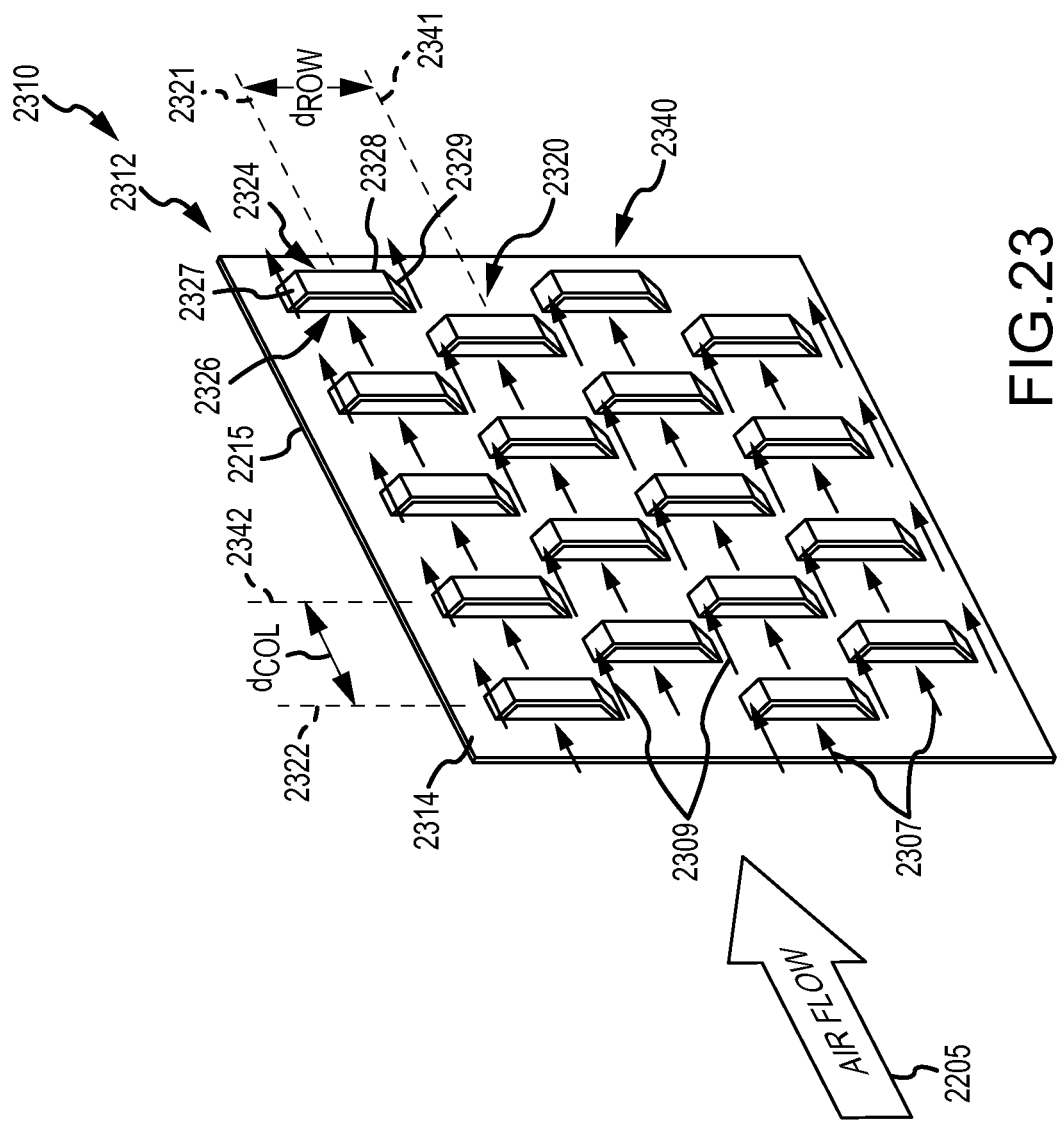
Figure 24:
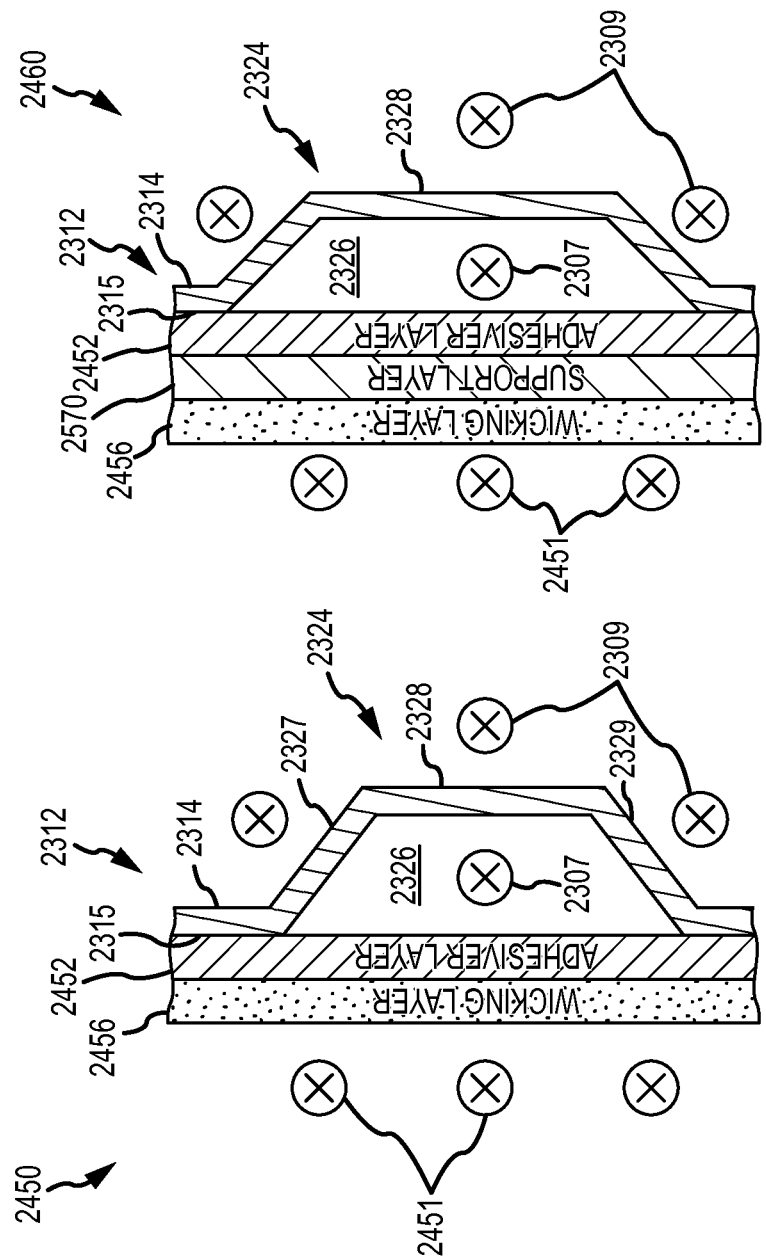
Figure 25:
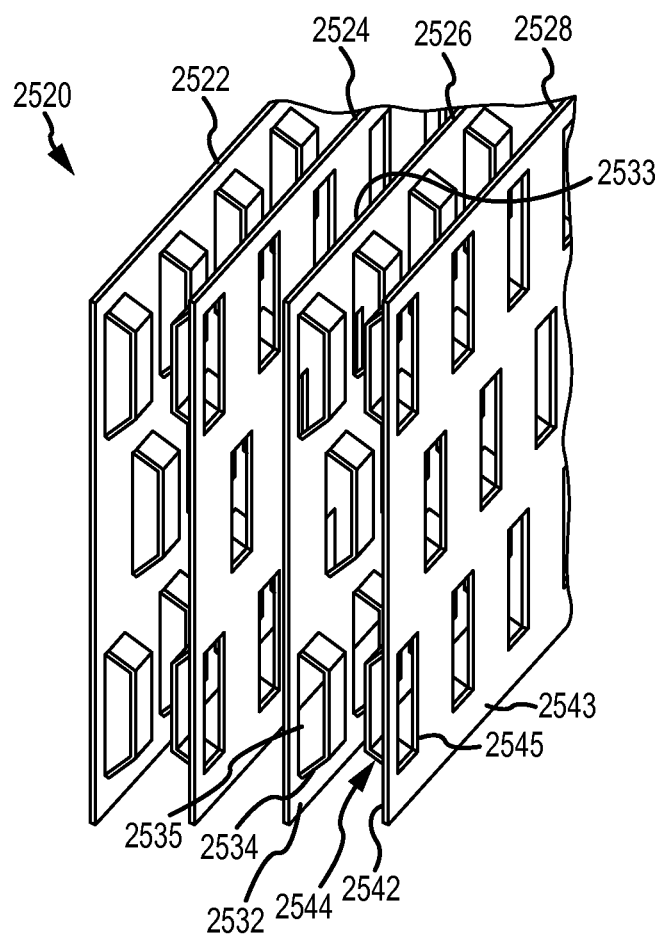
Figure 26:
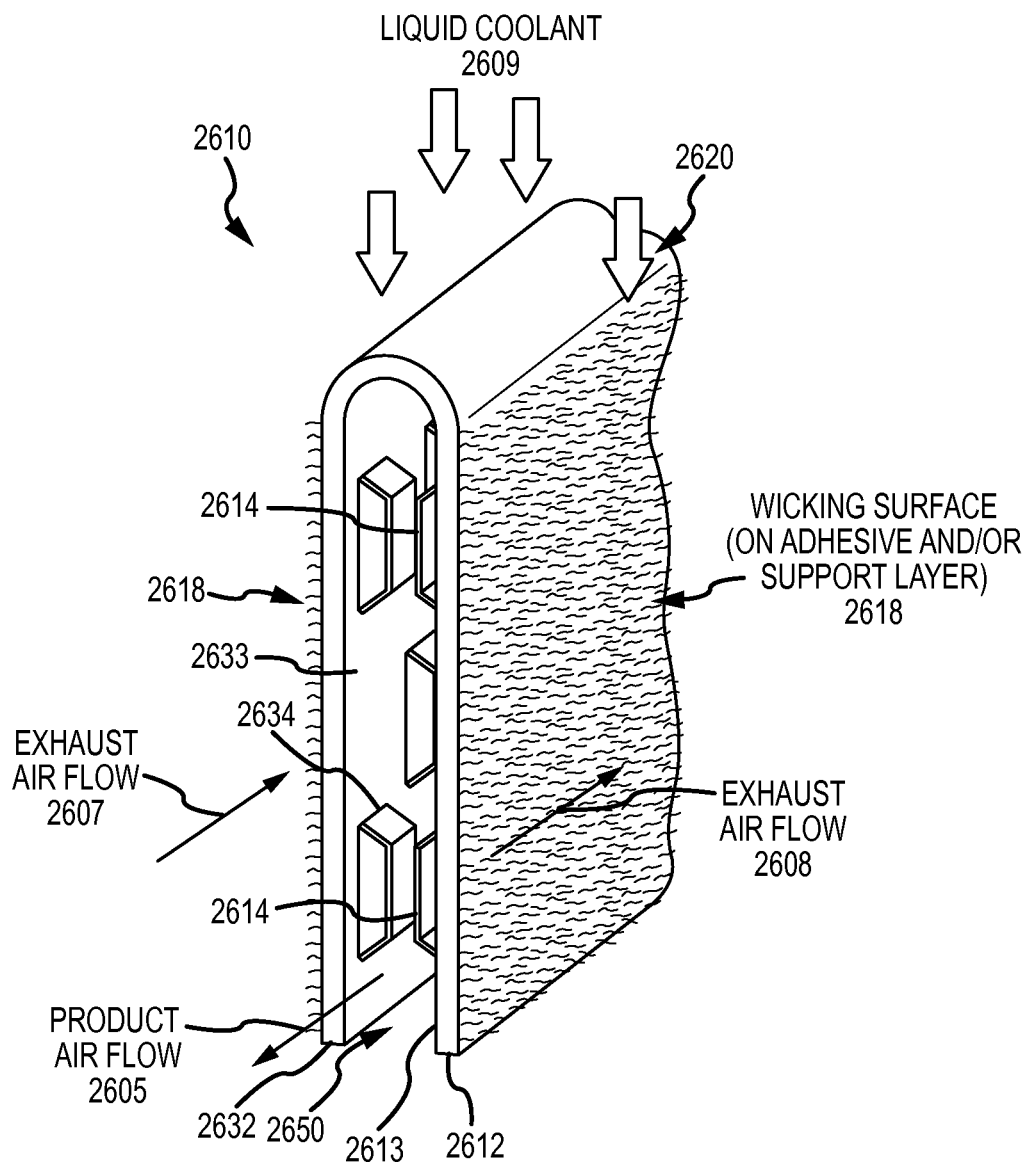
Figure 31A:
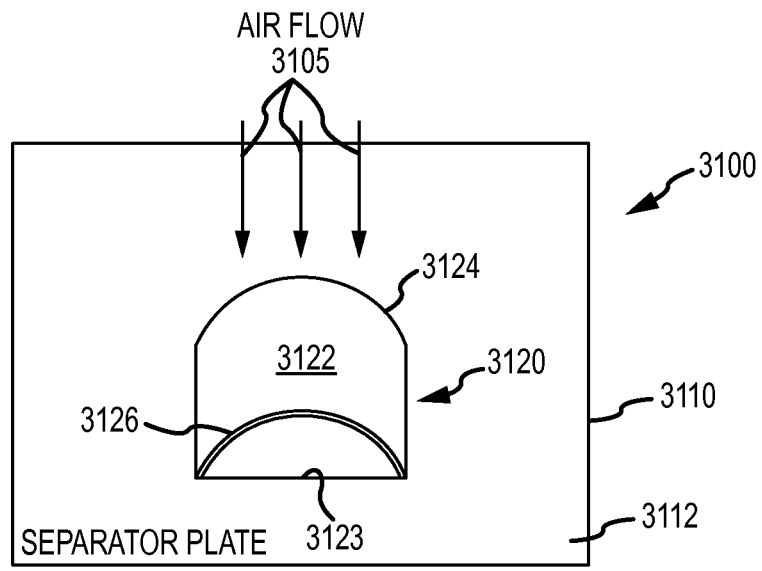
Figure 31B:
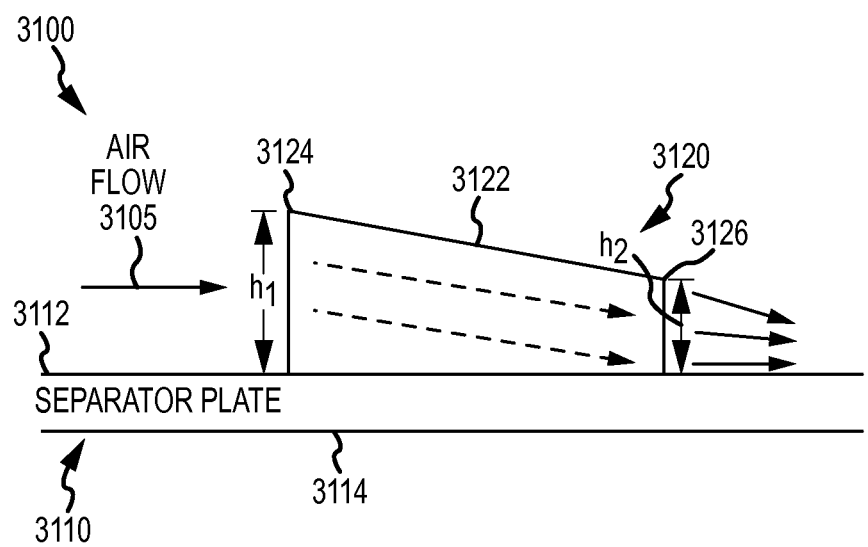

FIGS. 5A-B illustrates an exemplary modeling of an evaporative cooler or counterflow heat/mass exchanger such as one with the stack assembly shown in FIG. 2 and flow arrangement shown in FIG. 4;

FIG. 6 is a graph of air flow and surface temperatures along the length of the exchanger modeled as shown in FIGS. 5A-B;

FIG. 7 is a graph of humidity ratios of the air along the length of the exchanger modeled as shown in FIGS. 5A-B;

FIG. 8 is a graph showing concentration of liquid desiccant flowing through the modeled heat exchanger of FIGS. 5A-B;

FIG. 9 is a psychrometric chart showing the cooling and dehumidification process modeled as shown in FIGS. 5A-B;

FIG. 10 is a top view of another exemplary heat exchanger illustrating air flows through a plurality of channels or chambers provided by membrane-based assemblies such as those shown in FIGS. 1-3 or other embodiments shown or described herein;

FIG. 11 is a top view of another exemplary heat exchanger similar to those shown in FIGS. 4 and 10 showing a differing unit arrangement with differing exhaust airflows;

FIG. 12 is a psychrometric chart showing the cooling and dehumidifying process modeled similar to the modeling shown in FIGS. 5A-B for the configuration of a heat exchanger shown in FIG. 10;

FIG. 13 illustrates a HVAC system using an indirect evaporative cooler to provide conditioned air to a building;

FIG. 14 is a psychrometric chart providing results of one test of a prototype fabricated similar to the embodiment of FIG. 4 with the stack assembly of FIG. 2;

FIG. 15 illustrates in schematic form an evaporative cooler or heat exchanger similar to that shown in FIG. 1 including another representative permeable membrane stack or assembly;

FIGS. 16 and 17 illustrate in schematic form two humidification sections (or portions of a stack that may be provided in such a section), each of which makes use of a wicking layers wetted with water or other humidification fluids/sources;

FIGS. 18, 19, and 20 provide, respectively, a schematic side view of a two-stage evaporative cooler, a top view of a pair of first and second stage stacks used to form the cooler, and a psychrometric chart of the cooling process provided during operation of the two-stage evaporative cooler;

FIGS. 21 and 22 provide, respectively, a top view of a cooler similar to that of FIG. 19 but with an added direct evaporative stage and a psychrometric chart of the cooling process during operation of the cooler;

FIG. 23 is a perspective view of a separator plate with heat transfer enhancements in the form of slit fins, with the separator plate shown during use within an AAHX of an IEC to show representative air flows;

FIGS. 24A and 24B are sectional views of a portion of a separator plate assembly showing two different techniques for sealing holes created by providing the heat transfer enhancements shown in the separator plate of FIG. 23;

FIG. 25 illustrates a portion of an IEC with heat transfer enhancements on stacked separator plates;

FIG. 26 illustrates a portion of (or assembly for an) IEC with a stacked arrangement of separator plates provided by bending or forming a single sheet with heat transfer enhancements so as to provide a sealing end cap;

FIG. 27 illustrates a top view of a portion of (or assembly for an) IEC where the heat transfer enhancement provided for a separator sheet involves cross sectional shape of the plate body (e.g., a non-planar body);

FIG. 28 illustrates a top perspective view of a separator plate with heat transfer enhancements in the form of dimple fins;

FIG. 29 illustrates a side perspective view of a plate stack or assembly with heat transfer enhancements in the form of an offset strip fin assembly sandwiched between dry sides/surfaces of two adjacent or paired separator plates;

FIG. 30 illustrates a separator plate with heat transfer enhancements in the form of tabbed fines; and FIGS. 31A and 31B show top and side views of a portion of a separator plate with a heat transfer enhancement in the form of an asymmetrical conical slit fin.

DESCRIPTION

With regard to FIGS. 1-22, the following describes several techniques for implementing an indirect evaporative cooler (IEC) including ones where no membrane is used on the water (or coolant) side of the device and liquid desiccant is contained by a vapor permeable membrane. The description with reference to FIGS. 1-22 then also discusses implementations of IECs that provide water containment and spreading by flocked or wicked surfaces without a membrane (e.g., these aspects are added to the originally described IECs of FIGS. 1-22). Further, a direct evaporative cooler stage is added in some implementations to allow for extra sensible cooling.

Beginning with FIG. 23, though, techniques for providing heat transfer enhancements in IECs are described in detail, and it may be useful to summarize some of these heat transfer enhancement concepts at this point in the description and then to pick up the more detailed discussion following the discussion of the IECs of FIGS. 1-22.

Particularly, the following provides a description of embodiments that use features of separator plates or separation walls to enhance the heat transfer in an indirect evaporative cooler (IEC). The type of IEC typically modified to include such heat transfer enhancements is one with an air-to-air heat exchanger (AAHX). In an AAHX, one air stream is in direct contact with the dry surfaces and a second airstream is in contact with a surface that is wetted with a liquid coolant such as water or a refrigerant. The IEC can be arranged in concurrent flow, cross flow, or counter flow configurations and still benefit from the heat transfer enhancements. In each of these flow arrangements, air is produced that is cooled to temperatures very close to the wet bulb of the air entering the wetted side of the separator plates.

The inventors recognized that the convective air heat transfer on the dry side of an IEC (e.g., dry side of the separator plates) is generally the limiting factor in how small an IEC/AAHX can be constructed and still provide a particular amount of cooling. As a result, enhancing the convection coefficients is of a primary concern to improving heat transfer to reduce required sizes of IECs. In general, the heat transfer enhancements presented herein may be thought of as methods or techniques for increasing the heat transfer that revolve around or involve creating mixed air flow in the dry air channels and creating high temperature gradients near the separator plate surfaces. This is desirable as higher temperature gradients result in higher heat transfer to the separator plate. Some of the heat transfer enhancements described use techniques that rely on the separator plate being made of substantially thermally conductive materials such as a metal (e.g., aluminum or the like). Other enhancements, though, do not rely on the thermal conductivity of the separator plate being relatively high, and the plates may be formed of plastic such as polypropylene or the like.

With regard to heat transfer enhancements that utilize metal (or high thermal conductivity) separator plates, one useful implementation involves use of slit fins. Slit fins are provided in a separator plate by slitting the metal plate on two parallel lines for example. The metal is slit such that a bridge-type feature is formed that extends outward a distance into the air flow path of the dry side of a heat and mass exchanger. The bridge-type feature or member creates an extended surface that transfers heat from the bulk separator plate material (i.e., the plate body) through the extended surface provided by the plurality of bridge-type members and into the air stream.

Extending the surface of the plate out into the flowing air stream with the bridge elements (formed by slitting the plate body) provides two effects that increase heat transfer. First, the bridge member in effect reaches out to the air that is, in general, the hottest (at the highest temperatures), and, as a result, the bridge members increase the local temperature difference between the air and the extended surface of the bridge member (or slit fin). Second, the air flow boundary layer is re-started at the beginning of each slit fin or bridge member at the leading edge of the fin/bridge member (or the extended plate surface provided in the air stream). Such re-starting of the boundary layer increase heat transfer due to the high air speed and thermal gradients that are produced by this heat transfer enhancement feature.

IECs may also be provided that include slits in the separator plates with each (or a fraction of) the slits being configured to also act as a turbulator or air mixer within the air stream (or channel containing the flowing air in the IEC). In such implementations, the slit is formed such that it promotes the turbulating of the air. To this end, each slit may include a number of characteristics or features to cause turbulence on the dry side of the separator plate. First, the angle, at which the slit fin directs the air toward the surface of the separator plate, may be chosen to generate turbulent or unsteady air flow. More particularly, directing air toward the surface of the separator plate increases the air speed gradient of the air next to the separator plate and, thus, increases the thermal gradient, which promotes higher heater transfer rates. Second, the angle at which the slit fin directs the air flow can be chosen so as to change air flow directions and, thus, create vortex flow. The vortex flow acts to mix air in the flowing air stream, which increases the thermal gradients in the air stream next to heat transfer surfaces of the separator plate.

The slitting of the separator plate may be performed to create rectangular tabs or tabbed fins such as by providing slits where three slides are cut or slit. The resulting object or fin body may then be bent toward the air side of the separator plate such that in use the tabbed fin or fin body is positioned within the air stream, e.g., at an angle of about 20 to 90 degrees. In some implementations, the tabbed fins or fin bodies are bent at angles of 90 degrees relative to the plate surface but are also at an angle, e.g., 25 to 35 degrees with 30 degrees being useful in some cases, to the air flow (or air stream direction in the IEC channel) such that each tabbed fin (or some fraction thereof) creates vortex flow downstream from the tabbed fin (or simply "tab"). Such a flow creates mixing in the air, which results in higher thermal gradients in the air flow and increases heat transfer to the separator plate.

Other heat transfer enhancements do not utilize metal separator plates or rely on the thermal conductivity of the separator plate, and IECs may be provided with separator plates formed of plastic or other lower thermal conductivity materials, with heat transfer enhancements as discussed herein. For example, heat transfer enhancements may be provided in the form of triangular-shaped turbulators. The turbulators on the separator plates may act to create vortices in the air flow so as to mix the air stream and create higher thermal gradients in the air stream next to the separator plate. With the use of plastic or similar material for the separator plate, no substantial heat is typically transferred through the triangular-shaped turbulator itself (as compared to use of turbulators with a metal (e.g., aluminum) separator plate).

With many of the heat transfer enhancement designs, a hole is created where the enhancement such as a slit fin or tabbed fin is cut from the separator plate body. It generally would be undesirable to use a separator plate in IEC with an AAHX as the air can transpire from one side of the separator plate to the other (e.g., from the dry side to the wet side of the separator plate in some IEC configurations). Hence, in most implementations of IECs of the present description, the hole is covered to prevent air flow through the separator plate body at the location of the heat transfer enhancement elements/members.

For example, the IEC (or its AAHX) may include a layer of sealing material (e.g., a sealant layer) on the separator plate opposite the dry side and the fins or other enhancement elements/members. The sealant layer may be formed with a layer of adhesive, plastic, and/or metal, and the sealant layer may be adhered to the opposite side of the plate to where the fins enhancement members protrude so as to cover the hole. The sealant layer can, in some cases, be formed with two or more layers of materials. For example, a first layer may be a film or thickness of adhesive and a second layer may be a hydrophilic layer, e.g., formed of fibers such as flocking or a woven or unwoven fabric to provide a wicking layer. When the IEC is in operation, the hydrophilic layer acts to spread liquid coolant (e.g., a refrigerant such as water) on the wet side of the IEC. Concurrently, the adhesive layer creates a barrier to prevent air flow through the holes.

A third layer may be introduced to provide a sealant layer or assembly that is made up of an adhesive layer (adjacent to the separator plate surface with the holes), a solid plate or body, and a hydrophilic layer. In this implementation, the solid plate/body or solid layer may be provided with a thin layer, sheet, film, or foil of plastic, metal, or other material. The adhesive and solid layers may be quite thin such as less than 0.005 inches in thickness, but, more typically, these two layers would be 0.001 to 0.01 inches in thickness.

Other examples can be provided of heat transfer enhancements that do not rely on the separator having high thermal conductivity, and some of these examples may not require that holes be created in the separator plate (or that such holes be covered/sealed). One such IEC example may include separator plates that are made or fabricated so as to be wavy (or non-planar when viewed on end or in cross section). The wavy separator plates (e.g., sinusoidal sidewalls of airflow channels) make it so that air flow through the channels is directed by the waviness of the separator plate. Redirecting the flow creates mixing and areas of increased gradients of airflow speed adjacent to the separator plate. The increased airflow gradients produce higher thermal gradients, which increase the heat transfer rate between the air and the separator plate (or plates in the IEC).

To fabricate the IEC with separator plates having any of the heat transfer enhancements described herein, a sheet or body with heat transfer enhancements may be bent over to define two side by side separator plates with an end wall (e.g., an arcuate or rectangular end cap) that can be used to block coolant flow. The two separator plates then define a dry or airflow channel, with the end wall or end cap acting to prevent water from entering the dry channels. During operations, water or other liquid coolant may be applied to the top of the heat and mass exchanger (or IEC) to flow on the wet side of the separator plate (e.g., in a wicking or flocking layer applied to the wet side of the separator plate) without concern of other mechanical sealing components.

Now, the description turns more generally to IECs such as those that make use of membrane to contain liquid desiccant for dehumidification and use flocked surfaces to provide coolant flow. The use of heat transfer enhancements will then be discussed in further detail (e.g., with the understanding of use of flocked surfaces well understood in IECs).

The following provides a description of exemplary indirect evaporative coolers with dehumidification and mass/heat transfer assemblies for such coolers that provide inlet air stream chambers with sidewalls defined by permeable membrane sheets containing liquid desiccant. The assemblies also include outlet or exhaust air stream chambers (such as in counterflow to the inlet air streams) with sidewalls defined by permeable membrane sheets containing coolant such as water. In embodiments described below, the membrane is "permeable" in the sense that moisture in the form of a vapor (e.g., water in the vapor state) generally can permeate readily through the membrane such as from an inlet supply air and from liquid coolant via evaporation. However, the membrane generally contains or blocks moisture in the form of a liquid from flowing through as it is instead directed to flow within the channel or chamber. In some cases, water in the liquid state is contained by the membrane at pressures less than about 20 psi and more typically less than about 5 psi. The coolant and the liquid desiccant in some embodiments are maintained at pressures below about 2 psi, and the permeable membrane contains moisture such as water in the liquid state while water vapor permeates the membrane.

As will become clear from the following description, use of the assemblies such as for evaporative coolers or mass/heat exchangers provides a number of benefits. The inlet or process air stream can be cooled and dehumidified simultaneously or in a single chamber/stage, and this combined action reduces system size and cost as well as the number of required components and equipment (e.g., do not require a multi-stage unit or device to cool and then to dehumidify and/or further cool with refrigerant or the like). The combination of liquid desiccant dehumidification with indirect evaporative cooling provides very high energy transfer rates due to evaporation and absorption. The design creates a liquid desiccant system that does not require separate equipment for liquid desiccant cooling (e.g., a separate cooling tower or chiller). The stacked arrangements or multi-layered mass/heat transfer assemblies (or manifolded flow chambers/channels) enable ultra-low flow liquid desiccant designs. This is due in part to the enhanced geometry of the assembly and its ability to decrease the liquid desiccant's temperature to a lower temperature than achievable with traditional cooling tower technologies. Hence, in the cooler, there are higher concentration gradients of liquid desiccant (e.g., more than 20 percentage points of lithium chloride (LiCl) and similar gradients for other desiccants), which provides the following advantages: (a) a higher thermal coefficient of performance (COP) to regenerate the desiccant (i.e., to remove water from the desiccant) for reuse in the cooler; (b) less desiccant storage requirements due to better utilization; and (c) ability to use desiccants that are less expensive than LiCl such as calcium chloride (CaCl), which may not be used in conventional systems because their absorption properties are not as favorable as LiCl but lower temperature operation provided by the cooler embodiments described herein makes the properties of this and other "weaker" desiccants more acceptable or favorable.

The use of membranes as chamber sidewalls facilitates fabrication of counter-flow and counter-flow with pre-cooled exhaust air embodiments. Liquid desiccant containment with water molecule-permeable membranes eliminates liquid desiccant "carry over" in which small droplets of desiccant are passed into the air stream as is a concern with direct contact arrangements. The embodiments described herein also provide considerable reduction or even elimination of deposited solids during the process of water evaporation or adsorption (and liquid flow rates can be maintained at levels that are high enough to further control potential deposits) whereas fouling leads to increased maintenance and operating costs with prior evaporative coolers.

FIG. 1 illustrates in a schematic an evaporative cooler (or mass/heat exchanger) 100 that is useful for providing concurrent or simultaneous dehumidifying and cooling of a process or inlet air stream 120 (e.g., outdoor or process air to be cooled and conditioned prior to being fed into a building ventilation system). The cooler 100 is shown in simplified form with a housing shown in dashed lines, without inlet and outlet ducts, plumbing, and/or manifolds. Also, the cooler 100 is shown with a single mass/heat transfer stack 110 whereas in a typical cooler 100 there would be numerous stacks 110 provided by repeating the configuration shown (e.g. by alternating the liquid passed through the chamber defined by the membrane and wall) to provide an assembly with a plurality of air and liquid flow channels or chambers to provide the desired mass and heat transfer functions described for the stack 110.

As shown, an inlet air stream 120 is directed in a chamber or channel defined in part by a sheet or layer of a membrane 112. Liquid desiccant 124 flows in an adjacent chamber or channel on the other side of the membrane 112. The liquid desiccant 124 is contained by the membrane 112, which is permeable to water molecules in a liquid or vapor state but generally not to the components of the liquid desiccant 124. The chamber for the desiccant flow 124 is also defined by a sheet or layer of material that is impermeable to fluid flow (i.e., a separation wall) 114 so as to contain the liquid desiccant 124 in the chamber or flow path. The chamber for stream 120 is also defined by an opposing membrane (not shown) that is used to contain another flow of liquid desiccant. In this manner, heat is passed or removed from the inlet air stream 120 and transferred to the liquid desiccant flow 124 (and the desiccant behind the opposite sidewall/membrane (not shown)). Concurrently, the inlet air stream 120 is dehumidified as water 130 is removed by passing through the permeable membrane 112 into liquid desiccant 124.

The liquid (or gas) desiccant 124 may take many forms to act to dehumidify and cool the air stream 120 as it passes over the membrane 112. Desiccant 124 is generally any hygroscopic liquid used to remove or absorb water and water vapor from an air stream such as stream 120. Preferably, the desiccant 124 chosen would be a regenerable desiccant (e.g., a desiccant that can have the absorbed water separated and/or removed) such as a glycol (diethylene, triethylene, tetraethylene, or the like), a salt concentrate or ionic salt solution such as LiCl, CaCl, or the like, or other desiccants. The membrane 112 may be formed of any material that functions to contain liquid desiccant 124 and, typically, coolant 126 (e.g., water or the like) while also being permeable to molecules of water in liquid or vapor state. For example, polymer membranes may be used that have pores that are about the size or just bigger than a water molecule and, in some cases, that are also adapted to provide water molecules with high mobility through the membrane 112. In one particular embodiment, the membrane 112 is formed from a membrane material as described in detail U.S. Pat. No. 6,413,298 to Wnek, which is incorporated in its entirety herein by reference. The membrane material may also be obtained from a number of distributors or manufacturers such as, but not limited to, Dias-Analytic Corporation, Odessa, Fla., U.S.A. The membranes 112, 118 and separation wall 114 preferably also are formed from materials that are resistive to the corrosive effects of the desiccant, and in this regard, may be fabricated from a polymer or plastic with the wall 114 in some cases being formed of a corrosion resistant metal or alloy, which provides a higher thermal conductivity compared with a plastic.

The embodiment 100 shown is configured for counter-flow of the pre-cooled exhaust air stream 128 (relative to the inlet air stream 120). Other embodiments may use cross (at about a 90 degree flow path) or quasi-counter flow (e.g., not directly counter or opposite in direction but transverse such as a greater than 90 degree angle flow path relative to air stream 120). The exhaust air stream 128 flows in a channel or chamber defined by a sheet or layer of membrane (e.g., second or lower membrane) 118 and an upper membrane of another stack (not shown). The separation wall 114 and membrane 118 define a flow chamber or channel for coolant flow 126, which is typically a flow of water or the like. Heat is transferred from the liquid desiccant 124 to the coolant 126 through the separation wall, and the coolant 126 is cooled as heat and mass (e.g., water or other moisture 132) is transferred to the exhaust stream 128 via membrane 118. Heat transfer is not shown but generally is flowing through the membrane 112 to the liquid desiccant 124, through the separation wall 114 from the liquid desiccant 124 to the coolant 126, and through the membrane 118 from the coolant 126 to the exhaust air stream 128. The membranes 112, 118 are relatively thin with a thickness, $t_{mem}$, that typically is less than 0.25 inches and more typically less than about 0.1 inches such as 100 to 130 microns or the like. The membrane 112, 118 may have a tendency to expand outward if unrestrained, and, in some embodiments, such as that shown in FIG. 3, a divider or "flow field" support is provided in the inlet air stream 120 and exhaust air stream 128 (i.e., in the airflow chambers) to maintain the separation of the adjacent membranes (e.g., a plastic or metallic mesh with holes or openings for air flow and a zig-zag, S or W-shaped, or other cross section (or side view) that provides many relatively small contact points with the membranes 112, 118). The separation wall 114 also typically is relatively thin to facilitate heat transfer between the desiccant 124 and coolant 126 such as with a thickness, $t_{wall}$, of less than 0.125 inches or the like. The flow chambers for the air, desiccant, and coolant are also generally relatively thin with some applications using chambers less than 1 inch thick (or in depth) while others use chambers less than about 0.5 inches such as about 0.25 inches or less.

FIG. 2 illustrates an indirect evaporative cooler 210 utilizing the membrane/separation wall/membrane stack or assembly configuration to provide a mass/heat transfer exchanger device in which dehumidification and cooling occur within a single stage and, therefore, an integral or unitary device. In some embodiments (not shown), there is no desiccant side membrane or desiccant flow. Thus, these embodiments are useful for providing an indirect evaporative cooler in which the membrane contains liquid coolant but not liquid desiccant and the membrane typically would not be provided on the supply air side (or in these channels) to provide better heat transfer surfaces with the separation wall. As shown in FIG. 2, the cooler 210 includes a mass/heat transfer assembly formed from stacks or devices 212, 230, 240 and such an assembly of stack would typically be repeated to provide a plurality of inlet and exhaust air, coolant, and desiccant flow channels or chambers in the cooler 210. As shown, each set of stacks (or layered assemblies or devices) 212, 230, 240 is formed similarly to include a membrane, a separation wall, and a membrane, with the membrane being permeable to water on the molecular level to allow mass and heat transfer and the wall being impermeable (or nearly so) to only allow heat transfer and not mass transfer.

Specifically, the stack 212 includes an upper membrane layer 214, a separation wall 216, and a lower membrane layer 218. Dividers or spacers (not shown) would typically be provided to space these layers apart to define flow channels for coolant 215 and for liquid desiccant 217. For example, the separators may be configured to also provide a connection to a supply line for coolant and for regenerated desiccant, provide a manifold(s) to direct flow through the various stacks 212, 230, 240, and provide a connection to a return line for the coolant and diluted desiccant. The stacks 230 and 240 likewise include an upper membrane layer 232, 242, a separation wall 234, 244, and a lower membrane layer 238, 248. The stack 240 has coolant (such as water) 243 directed in the chamber between the upper membrane 242 and wall 244 and desiccant 246 flowing between the wall 244 and lower membrane layer 248 similar to stack 212. In contrast, the stack 230 has liquid desiccant 233 directed to flow in the chamber defined by the upper membrane layer 232 and wall 234 and has coolant 236 directed to flow in the chamber or channel defined by the wall 234 and lower membrane layer 238.

The cooler 210 includes ducting and the like (not shown) to direct supply inlet air 250 through the channel or flow path between the stack 212 and the stack 230. The arrangement of the stacks 212, 230, 240 and contained fluids results in the supply inlet air 250 being passed over the surfaces of the membranes 218, 232 that are containing liquid desiccant 217, 233. As a result, supply outlet air 254 is output that is dehumidified as moisture in the air 250 is absorbed by the desiccant 217, 233 via permeable membrane 218, 232, and the air 254 is also cooled by the interaction with desiccant 217, 233. The cooling effect in the cooler 210 is in part effected by a fraction of supply outlet air 254 being redirected in the cooler 210 by ducting/manifolds (not shown) to flow as pre-cooled exhaust air 255 through the channel or flow path between stacks 230, 240 to be output as warmer and moister air 258. Heat passes from desiccant 233 through wall 236 to coolant 236 (with similar heat transfer occurring in stacks 212, 240), and the coolant 236 is able to transfer heat and mass (e.g., water molecules) via membrane 238 to the incoming exhaust air 255. As discussed above, the stack pattern or set provided by 212, 230, 240 would typically be repeated within the cooler 210 to create a mass/heat transfer assembly with numerous, parallel flow channels for air, coolant, and desiccant.

The cooler 210 is shown as a counter flow exchanger, but other flow patterns may be used to practice the desiccant-based dehumidification and cooling described herein. For example, cross flow patterns may readily be established as well as quasi (or not fully opposite) counter flow patterns. These patterns may be achieved by altering the manifolding and/or ducting/plumbing of the cooler as well as the dividers provided between the stacks. Additionally, the counter flow passages may be provided integral to the stack assembly rather than externally as is the case in the cooler 210. For example, the cooler 310 has a similar stack arrangement as shown in the cooler 210 of FIG. 2 except that it includes a counterflow baffle or dividing wall 360 on the end of the flow channels for inlet air 250 and exhaust air 258. The counterflow divider 360 allows a majority of the cooled air to exit the stacks as supply outlet air 354 (e.g., more than about 50 percent and more typically 60 to 90 percent or more of the air flow 250). A smaller portion (e.g., a volume equal to the make up outdoor air or the like) is directed by divider 360 to flow between stacks 230, 240 as pre-cooled exhaust air 355. FIG. 3 also illustrates the use of a divider or flow field baffle 370 that functions to maintain a separation of membranes in the stacks 212, 230, 240 (or at about their original thickness rather than puffed out or expanded as may occur with some permeable membranes). The dividers 370 may take many forms such as a mesh with a wavy pattern (e.g., an S or W-shaped side or cross sectional view), with the mesh selected to provide as little resistance to air flow as practical while still providing adequate strength. Also, it is desirable to limit the number of contact points or areas with the membranes as these can block moisture transfer from the air 250 and to the air 355.

FIG. 4 illustrates an indirect evaporative cooler 400 of one embodiment. A housing 410 is provided for supporting a mass/heat transfer assembly such as one formed with the stack sets shown in FIGS. 1-3 and 15-19. As shown, the housing 410 includes a first end 412 with an inlet 414 for supply inlet airflow 415 and an outlet 416 for exhaust airflow 417. The cooler 4100 further includes a second end 418 opposite the first end 412 that provides an outlet or vent for directing supply outlet airflow 420 to an end-use device or system (e.g., an inlet or supply for return air to a building). The second end 418 is also configured to redirect a portion 426 of the cooled (and, in some operating modes, dehumidified) air 426 for use in counter flow cooling of the supply inlet airflow 415. A prototype of the cooler 400 was fabricated with a stack assembly as shown in FIG. 2 with 32 desiccant channels. The prototype was tested with 10 liters per minute (LPM) flow (or about 0.3 LPM per desiccant channel). Coolant was provided as water at a water flow rate of about 1.25 to 2.00 times the evaporation rate. The evaporation rate for this prototype was about 1.33 gallons/ton-hr or about 5 liters/ton-hr, which provides a water or coolant flow rate of about 6-10 liters/ton-hr of cooling. Of course, these are exemplary and not limiting flow rates, and it is expected that the flow rates of liquid desiccant and coolant will depend on numerous factors and will be matched to a particular channel design and cooling need as well as other considerations.

An indirect evaporative cooler such as the cooler 400 using stack sets as shown in FIG. 2 (or FIGS. 15-19) may be modeled to determine the effectiveness of the use of a permeable membrane to contain coolant and liquid desiccant. FIGS. 5A-B provides a diagram 500 of such modeling showing use of stacks 212, 230, and 240 as discussed with reference to FIG. 2 to cool inlet or process air and to also dehumidify this air in the same stage or process. The inputs to the model 500 are shown, and results for a typical inlet air condition are provided, with results and modeling being performed in this case with Engineering Equation Solver (EES). The numeric values shown in boxes or with squares around them are input values (or assumed typical operating conditions), and the values outside or without boxes are outputs or results of the modeling. The modeling results shown in the diagram 500 are believed to be self-explanatory to those skilled in the heating, ventilation, and air conditioning (HVAC) arts and do not require detailed explanation to understand the achieved effectiveness of the embodiments using membrane containment in indirect evaporative coolers; however, the following provides a graphical description of some of the results in the model 500.

FIG. 6 illustrates a graph or diagram 610 showing the temperatures of the air flows in the channels between the stacks (e.g., in an evaporative cooler using such mass/heat transfer assembly described herein). The graph 610 also shows surface temperatures along the length of the counterflow mass/heat exchanger (e.g., exchanger 400 with stack arrangements as shown in FIG. 2). Specifically, the graph 610 shows the temperature of supply air with line 612, the temperature of exhaust/purge air with line 614, the temperature of the desiccant side membrane surface (e.g., at the interface of the membrane and the supply air) with line 616, the dewpoint temperature of the desiccant side membrane surface (e.g., at the interface of the membrane and the supply air) with line 620, and the temperature of the water side membrane surface (e.g., at the interface of the membrane and the exhaust/purge air) with line 618.

FIG. 7 is a graph or diagram 710 showing the humidity ratios of the air along the length of the counterflow heat/mass exchanger. Specifically, the graph 710 shows the bulk humidity ratio of the supply air with line 712, the bulk humidity ratio of exhaust/purge air with line 714, the humidity ratio of the air in close proximity to the desiccant side membrane surface (e.g., at the interface of the membrane and the supply air) with line 716, and the humidity ratio of the air in close proximity to the water side membrane surface (e.g., at the interface of the membrane and the exhaust/purge air) with line 718.

FIG. 8 illustrates a graph 810 showing with line 815 the concentration of desiccant (in this particular modeling the desiccant is LiCl) as it flows concurrent with the supply air flow down the length of the counterflow mass/heat exchanger. As shown with line 815, the desiccant is getting weaker as it flows through the channel between the membrane and the separation wall as it absorbs water molecules from the air, e.g., the concentration of the desiccant is dropping from about 44 percent down to about 24 percent in this particular modeling example (which results from the membrane being characterized as permeable (at a particular input rate or setting) to water molecules in the flowing air at these operating conditions).

FIG. 9 shows the process of model 500 of FIGS. 5A-B in a psychrometric chart 910. The supply air shown with line 912 can be seen to be gradually losing humidity (in kilograms water vapor/kilograms dry air or $kg_v/kg_{da}$). The supply air 912 has its temperature initially rise slightly due to the large heat flow of vapor sorption into the desiccant. As the supply air 912 continues down the length of the exchanger (or flow channel or chamber between membrane layers or walls of adjacent stacks containing liquid desiccant), the temperature then drops to a cooler/drier condition than at the inlet. At the exit of the exchanger, the supply air 912 is split into two streams. The majority of the air is supplied to the cooled space, and the minority of the air (such as less than about 50 percent and more typically less than about 30 percent of the volume) gets funneled into the exhaust/purge side (or exhaust/counterflow channels between the membrane walls containing coolant) of the heat/mass exchanger or cooler, which is shown with the line 916. The exhaust air 916 has a low dewpoint, and, thus, it can pick up a large amount of heat evaporatively. The pre-cooled exhaust or purge air 916 picks up water vapor (and associated heat of vaporization) from the wet side channel. The air 916 exits out of the unit with a much higher enthalpy than either the supply inlet or exit shown with line 912. The diagram 910 also shows the humidity ratio and temperature of the supply air in close proximity to the desiccant side membrane surface (ds) with line 918.

The following table shows results in tabulated form for modeling of FIGS. 5A-B for inlet and outlet air flows. As shown, a wide range of temperatures and humidity levels can be chosen and input into the model 500. In the configuration whose results are shown in the table, the equivalent wet bulb effectiveness with the desiccant flow turned off (e.g., in some operating modes it may not be required or useful to utilize the desiccant to dehumidify the air) would be 113 percent, which means the cooler is able to cool the supply air below the inlet wet bulb temperature.

TABLE

Inlet and outlet conditions from model runs (° F. and kg/kg)

| Run # | $T_{supply,in}$ | $T_{supply,out}$ | $T_{exhaust,out}$ | $\omega_{supply,in}$ | $\omega_{supply,out}$ | $\omega_{exhaust,out}$ |
|---|---|---|---|---|---|---|
| 1 | 27.7 | 21.11 | 31.55 | 0.0133 | 0.00892 | 0.0289 |
| 2 | 50.0 | 33.7 | 50.7 | 0.0319 | 0.0179 | 0.0834 |
| 3 | 50.0 | 20.7 | 41.0 | 0.0077 | 0.00406 | 0.0494 |
| 4 | 30.0 | 13.1 | 27.2 | 0.00262 | 0.00158 | 0.0226 |
| 5 | 30.0 | 18.9 | 42.55 | 0.0269 | 0.0137 | 0.0547 |
| 6 | 15.0 | 16.9 | 25.4 | 0.0105 | 0.00418 | 0.0207 |
| 7 | 15.0 | 11.9 | 20.0 | 0.00528 | 0.00203 | 0.0147 | where LiCl Inlet Concentration = 44%; flow ratio (flow exhaust/(flow exhaust + flow supply) = 0.3; supply outlet face velocity = 175 SCFM; and ambient pressure = 101.3 kPa.

The cooler 210 of FIG. 2 (or FIGS. 15-19) may be thought of as a desiccant-enhanced, indirect evaporative cooler that utilizes a membranes or layers of membrane material that is permeable to water molecules to provide desired liquid containment. A standard psychrometric chart (such as one at 14.7 psi ambient pressure and other typical parameters) may be used to view lines of equal sensible heat ratios (SHRs) originating at a typical room setpoint. For vapor compression dehumidification, a SHR of less than about 0.7 is difficult to attain without reheat (e.g., given reasonable evaporator temperatures). Also, it is psychrometrically impossible to attain a SHR of less than about 0.6 without reheat, and attempting such a SHR often leads to frozen evaporator coils that require defrost cycles. The desiccant-enhanced, indirect evaporative cooler, such as shown in FIG. 2 at 200, addresses this problem with a unique, new process (as has been described above and is presented in more detail below).

It may be useful at this point to review the process with reference to FIGS. 2 and 3. FIGS. 2 and 3 show diagrams describing the inner flow channels of the unit or assembly for use in an evaporative cooler 210, 320. The mixed return/outdoor air is shown by the arrow 250 (e.g., return air from a conditioned space along with outdoor make up air such as 400 cfm/ton supply and 175 cfm/ton outdoor air or the like). The air 250 is dehumidified by the desiccant 217, 233 through the membrane 218, 232. This lowers both the dew point and temperature of this air stream until it is output at 254 or 354. At the exit of the supply air passage (between the liquid desiccant-containing membranes), a portion of the air is fractioned off as shown with arrows 255 and 355 and sent through an adjacent passage (between the coolant-containing membranes 238, 242) which picks up moisture from the water layer 236, 243 through the membrane 238, 242. The heat of evaporation is a source of cooling that acts to remove the sensible heat and heat of absorption from the supply air stream 250. This air is then exhausted (purged) out at 254, 354.

Heat exchanger configuration shown at 400 in FIG. 4 has been built in the laboratory by the inventors and was modeled as shown in FIGS. 5A-B. Other options for flow/housing designs are shown in configuration with the cooler 1000 of FIG. 10 and the cooler 1100 of FIG. 11. The cooler 1000 is shown to have a housing 1010 with a first portion or end 1012 and a second portion or end 1020. The first portion 1012 is configured with inlets or vents for receiving supply inlet airflow 1013 as well as input exhaust airflow 1014, and the first portion 1012 also includes vents or outlets for outputting exhaust airflow 1015 from the unit 1000. The second portion 1020 is configured (e.g., with manifolds and other components to direct air flow) with outlets for supply outlet airflow 1022 with a portion 1025 being redirected back into the housing 1010 as shown at arrows 1027 to provide counterflow for a fraction of the channel provided for supply inlet airflow 1013 (with exhaust airflow 1014 provided as a cross flow in the other or initial portion of the channel) and then this air is exhausted from the housing portion 1020 at 1028. The input exhaust airflow 1014 may be return air to be exhausted or outdoor air (e.g., from the building space). This approach 1000 improves the efficiency by utilizing a smaller purge airflow 1025, 1027, and it is typically preferred to limiting purge air flow to increase or maintain desirable efficiency.

Referring again to FIG. 4, operation of the cooler 400 is expected to have the cooling process shown in the psychrometric chart 910 of FIG. 9. As shown, line 912 represents the supply air flow while line 916 represents the purge air flow stream. The desiccant side air boundary layer is represented with line 918. The chart shows graphically how the dehumidification driver for the cooler 400 is advantageously utilized to provide a more effective cooler. The cooler 400 may use even a weak desiccant such as CaCl solution to provide significant dehumidification, and this is due in part to the cold temperatures that are achieved with the configuration of the cooler 400 that allow weak desiccants to attain high dehumidification potential.

The configuration shown with cooler 1000 of FIG. 10 was modeled to determine the desirability of its performance, and the results are provided in psychrometric chart 1200 of FIG. 12. In the chart 1200, line 1210 represents supply air, line 1212 represents ambient exhaust air, line 1214 represents desiccant side surface temperatures, line 1220 represents the supply air post cooling, line 1224 represents the purge air post cooling, and line 1230 is the sensible heat ratio line (SHR) in which the load on the building follows. So, for example, a building will have 0.67 units of sensible heat and 0.33 units of latent heat added to the space to arrive at the return air condition, which is the middle diamond at 80° F. and about 70 grains/lb, and that point may be considered the return air condition. The first point of line 1210 is the "mixed air" condition, which is a 30/70 mixture of outdoor air and return air. The two-stage approach to cooling provided by cooler 1000 allows the process to be split into two distinct sections of dehumidification plus a post cooling stage (e.g., sensible cooling only stage in which, for example, there is no desiccant layer and dehumidification and only evaporative cooling is provided). The cooler 1000 is, of course, only one example of numerous configurations that may be implemented to provide two or more stage cooling using the membrane containment features described herein, and it shows the possibility of attaining nearly any SHR desired (e.g., in this case, a SHR of about 0.67). In the modeling to provide the chart 1200, a 1 cubic foot core (or mass/heat transfer assembly) was used with 176 SCFM, and a flow ratio of about 0.3 (e.g., 30 percent purge and 70 percent supply air). Also, the return air was at 80° F. and 40 percent relative humidity, ambient air was at 86°

F. and 60 percent relative humidity, and the liquid desiccant fed into the assembly was 44 percent LiCl (but other desiccants such as solutions of salt (such as, but not limited to, halide salts) and water that are about 20 to 40 percent salt by weight may be used). The assembly was able to provide 0.5 tons of building cooling with just this 1 cubic foot at about 7 Btu/lb. As can be appreciated from this example and modeling, the use of membranes to contain desiccant and coolant (e.g., to contain liquids) enable indirect evaporative coolers to be produced that are much more compact than prior designs, that are easier to maintain (e.g., have less or no fouling issues), and that are more efficient in producing cooling (e.g., with simultaneous dehumidification and cooling to provide an evaporative cooler that can condition as well as cool process air).

FIG. 11 illustrates an evaporative cooler 1100 providing another counterflow arrangement in which the counterflow cooling air (or pre-cooled supply air) is directly opposite in direction but only for a selected length (such as half to 80 or 90 percent or more of the length) of the stacks or flow chambers (e.g., when full counterflow is not required or desired). As shown, the cooler 1100 includes a housing 1110 containing a plurality of stacks or sets of stacks configured as a mass/heat transfer assembly (as discussed above) with alternating flow channels for supply inlet airflow 1112 and for counterflow air (e.g., redirected supply outlet airflow 1114). The housing 1110 includes venting and/or manifolding for directing the supply inlet airflow 1112 (e.g., outdoor make up air and return air) into channels between desiccant containing membranes and to output the cooled and, often, dehumidified supply outlet airflow 1114. The cooler 1100 further includes ducting, manifolding, and the like for redirecting a fraction of the supply outlet airflow back into the housing 1110 to provide cooling counterflow air as shown at 1116 (e.g., into flow channels between coolant containing membranes). The counterflow air 1116 typically does not travel along the entire length of the housing 1110 but is, instead, discharged out a side vent at some point along a channel length (e.g., at a distance about 60 to 80 percent of the length). Such a configuration is useful to tune a cooler 1100 for particular operating environments (e.g., to provide a desired amount of cooling to the supply outlet airflow based on outside air temperatures and humidities and other operating parameters).

The stack and membrane technology described herein are readily applicable to a number of indirect evaporative cooler designs (with and without use of liquid desiccant for dehumidification) and applications. However, it may be useful to discuss the use of the technology within an air conditioning or HVAC system with the belief that those skilled in the art will readily understand that the technology is useful in many other such systems. FIG. 13 illustrates a simplified air conditioning system 1300 in which the membrane technology may be provided to provide desiccant dehumidification and evaporative cooling to condition air within a building 1310 (e.g., a residential or commercial building or other structure requiring conditioned and cooled air). As shown, the system 1300 includes a cooler 1320 with a housing 1322 that is used to house a membrane stack assembly, such as described above with reference to FIGS. 1-12 and below with reference to FIGS. 15-20. A fan or blower 1324 is provided to draw in outside or make up air 1325 and move return air 1326 from the building 1310. The fan 1324 pushes these two air streams as inlet supply air through the stacks as described above (e.g., adjacent liquid desiccant contained in membrane in embodiments providing dehumidification or adjacent separation walls in embodiments with just evaporative cooling). The cooled (and, typically, conditioned air is output at 1330 as supply to the building 1310 and a portion is returned 1332 as purge or pre-cooled exhaust air that passes on the coolant or evaporative cooling side of the stacks in housing 1322 and then out as exhaust 1328. Coolant is provided in the form of a water supply and drain 1334 to the housing (and through the stack assembly), and liquid desiccant is provided at 1338 as supply and drain. The desiccant 1338 is regenerated with a regenerator system 1340 including, in this example, a desiccant boiler 1342.

The desiccant enhanced indirect evaporative cooler (DE-IDEC) 1320 is the portion of the system 1300 that takes strong desiccant and water to provide cooling to building 1310. The system 1300 provides both sensible and latent cooling to building 1310 on demand and in proportion to the demand, e.g., the system 1300 can provide cooling in the form of 100 percent sensible, 100 percent latent, or any combination thereof. The DE-IDEC 1320 uses some portion of outdoor air 1325 with equal exhaust air 1328 to reject the heat load outside of the building 1310. The DE-IDEC 1320 itself can sit inside or outside of the building envelope because it has no wet surfaces and the liquid streams 1334, 1338 are closed loop. This makes system 1300 acceptable for indoor use and for placement of cooler 1320 inside the building 1310. The water source (or coolant source, not shown) for water or coolant 1334 is not required to be potable, and the system 1300 is compact enough to be acceptable by building managers. The electricity usage is much less than that of typical vapor compression systems or units (e.g., less than 0.2 kW/ton peak compared with 1.2 kW/ton typical for conventional compression units).

The regenerator 1340 is another of the significant components to the operation of the system 1300. This unit 1340 takes the weakened desiccant from the DE-IDEC 1320 and applies heat with boiler 1342 (see list of heat sources below) to drive off the moisture contained in the desiccant 1338. The result is a desiccant 1338 that has higher salt concentration and can be re-used by the DE-IDEC 1320 (e.g., in the membrane contained/defined flow channels adjacent to supply inlet air 1325, 1326). A list of heat sources suitable for desiccant regeneration may include: (a) gas or other fossil fuel; (b) solar heat; (c) waste heat from any waste heat stream such as combine heat and power plant; and (d) waste heat from a condenser unit originating from a vapor compression cycle.

The inventors performed a test of a prototype fabricated similar to the cooler shown in FIG. 4 with a stack assembly such as shown in FIG. 2. FIG. 14 provides results of the testing for this proof of concept prototype that was constructed and tested at 104° F. and 93 grains/lb inlet air. The prototype was tested with and without desiccant flow, but with membranes provided to define liquid desiccant flow channels. Without the desiccant flow, the indirect evaporative cooler had a wet-bulb effectiveness of 73%. When desiccant was turned on (with 41% LiCl solution as the desiccant), the effectiveness was 63% and had 12 grains/lb of dehumidification. This resulted in a sensible heat ratio of 0.73. The prototype did not reach model expectations as explained above, and this was likely due to prototype defects creating non-uniform air, water, and desiccant flow distribution.

It was recognized by the inventors that use of the membrane to contain the liquid desiccant and separate it from air flow is desirable in most if not all mass transfer/heat exchanger assemblies. For example, with reference to the indirect evaporative cooler 100 of FIG. 1, the membrane 112 is used to block flow of the liquid desiccant 124 into the inlet air stream 120 while concurrently allowing water molecules 130 to flow from the inlet air stream 120 to the desiccant 124 to dehumidify and cool the inlet or process air 120.

However, the inventors further determined that the second membrane 118 is not needed to practice many aspects of the evaporative coolers described herein. Particularly, an indirect evaporative cooler may be provided in which each stack only includes a single water-permeable membrane (such as membrane 112) while coolant flow is provided on the opposite side of a separation wall (such as wall 114) through other techniques such as by providing a flocking sheet or layer (or wicking element) on the separation wall 114 opposite the side of the wall defining the liquid desiccant flow chamber/channel. The stack may be arranged vertically in such embodiments of the evaporative cooler to make use of gravity to encourage coolant flow from the top to the bottom of the stack in the wicking layer. In other cases, though, the wicking layer or flocking may be provided on a top or bottom side of a separation wall (a horizontal stack arrangement) with capillary action (or other mechanisms) used to obtain a desired coolant flow through the stack.

FIG. 15 schematically illustrates an indirect evaporative cooler (or mass/heat exchanger) 1500, which may be used in place of the evaporative cooler 100 shown in FIG. 1. The cooler 1500 may be thought of as a modification of the cooler 100 with retained components or elements having like numbers in FIGS. 1 and 15. Particularly, the evaporative cooler 1500 is useful for providing concurrent dehumidifying and cooling of a process or inlet air stream 120. This is achieved with one or more mass/heat transfer stacks 1510. As shown, the inlet air stream 120 is directed to flow in a chamber or channel defined in part by a sheet or layer of a membrane 112, which may take the form described above for stack 110. Liquid desiccant 124 flows in an adjacent chamber or channel on the other side of the membrane 112. The chamber for the desiccant 124 flow is also defined by a separation wall 114, which, as described above, is impermeable to fluid flow so as to contain the liquid desiccant 124. The chamber for air stream 120 is also defined by an opposing membrane (not shown) that is used to contain another flow of liquid desiccant (e.g., a membrane of another stack configured similar to stack 1510).

As with cooler 100 of FIG. 1, the evaporative cooler 1500 is configured for counter-flow of the pre-cooled exhaust air stream 128 (relative to the inlet air stream 120). In contrast to the cooler 100, though, the exhaust air stream 128 flows in a channel or chamber defined on one side by a wicking layer or flocking element 1520 and on another side by an upper element of another stack (not shown, but may be another wicking layer or a membrane).

Significantly, the wicking layer or flocking 1520 is attached to a side of the separation wall 114 and acts to wick or guide flow of a volume of coolant 126 in the stack 1510. In other words, the second membrane 118 of cooler 100 is removed as it is not needed to define a coolant flow channel/chamber. Instead, the wicking layer 1520 may be thought of as defining a channel or flow path for the coolant 126, which is shown to be in counter to the exhaust air stream 128. The air in stream 128 is in contact with the wicking layer 1520 and the coolant 126.

The coolant 126 may be a flow of water or the like, and heat is transferred from the liquid desiccant 124 to the coolant 126 through the separation wall 114. The coolant 126 flowing or being wicked by wicking layer 1520 is cooled as heat and mass (e.g., water or other moisture 132) is transferred to the exhaust air stream 128 directly rather than through a membrane as in cooler 100 of FIG. 1. Heat transfer is not shown in FIG. 15 but generally heat is flowing through the membrane 112 to the liquid desiccant 124 via water 130 and then through the separation wall 114 from the liquid desiccant 124 to the coolant 126, and then from the coolant 126 to the exhaust air stream 128.

Capillary action may support flow of coolant 126 in wicking layer 1520 when the stack 1510 is arranged in a horizontal configuration, but some embodiments will position the stack 1510 including the separation wall 114 and attached/contacting wicking layer 1520 to be vertical such that gravity facilitated coolant flow 126 from the top to the bottom of the evaporative cooler 1500. As with the stack 110, the stack 1510 may be provided in multi-stack assemblies/coolers such as the cooler 210 with the stack 1510 being used to provide, or in place of, stack 230 (and/or other stacks 212, 240). In such an arrangement, the flow channel for the exhaust air stream 128 typically would be defined by facing but spaced apart wicking layers 1520 on separation walls 114 (e.g., spaced apart, flocked surfaces of two separation walls).

A variety of flocking materials may be used to implement the wicking layer 1520 on separation wall 114. The wicking layer 1520 acts to spread out or disperse the flowing coolant 126, e.g., to avoid rivulets of flowing coolant, which enhances heat transfer from the wall 114 and also mass/heat transfer to exhaust air stream 128 in the adjacent flow chamber/channel of stack 1510. The flocking material of the wicking layer 1520 also acts to impede gravity to get a slower flow in vertical configurations. The thickness of the layer 1520 may vary but in some cases may be approximately 0.015 inches thick while other useful implementations may use flocking in the range of 0.005 to 0.05 inches in thickness. Exemplary flocking for the wicking layer 1520 include: (a) knitted nylon fabric; (b) polypropylene woven or non-woven fabric; and (c) adhesive-backed flocking fibers (typically polyester or polypropylene), e.g., the layer 1520 may include fibers standing up along (or arranged transverse to) planar surface of wall 114 and may have lengths of 0.01 to 0.05 inches or more.

While a wide variety of materials may be used in layer 1520, there are a number of wicking or flocking characteristics that may be desirable for operation of the cooler 1500. The wicking surface of layer 1520 provides a method or mechanism to evenly spread either desiccant or water (as shown in FIG. 15) over a surface (e.g., surface or side of wall 114). The wicking surface impedes the forces of gravity on the flowing liquid to slow the flow rate down to a range of about 5 to 50 inches per minute, with some useful implementations using a flow of about 20 in/min. The flock also enables low total flow rate of water to be applied. The total flow rate of water or other coolant enables flow rates that are between 1.2 to 4.0 times the evaporation rate of water (or other coolant). Typically, this flow would be set based on water quality that is being used and would be 1.2 to 2 times the evaporation rate. In another embodiment, the flow rate of water may be set higher than in the above examples by use of re-circulating the water. In this case, the water flow rate may typically be 4 times evaporation rate and could be in the range of 3-10 times the coolant evaporation rate.

As shown in FIG. 15, indirect evaporative cooler 1500 provides a channel pair where a first airflow 120 is cooled and dehumidified by water absorption 130 through the vapor permeable membrane 112 to the liquid desiccant 124. The second airflow (in the second channel of the channel pair provided by stack 1510) 128 removes heat from the first airflow 120 by the evaporation of water 132. The water/coolant 132 is contained within a flocked or wicked surface (which provides layer of flocking 1520) on wall 114 opposite the flow channel for liquid desiccant 124. The evaporation 132 of water/coolant 132 from the flocked or wicked surface of wall 114 removes heat from the first airflow 120 by heat conduction and convection through the membrane-desiccant-separation wall assembly or stack 1510.

Generally, the cooling process or method provided by operation of an evaporative cooler (such as cooler 1500) involves receiving an input or process air stream. This process air stream undergoes dehumidification in a first section or portion of the evaporative cooler (i.e., the desiccant-contained dehumidification section), and this is followed by sensible cooling in a second section (i.e., indirect evaporative cooling section). As shown herein, though, dehumidification and sensible cooling may occur in a single or integral section or portion of the cooler to occur concurrently. The process air is then delivered to a work space or indoor area for use in cooling a space while the purge/exhaust air is used to remove heat from the coolant and is output/discharged from the cooler.

In some cases, it may be desirable for an indirect evaporative cooler to be provided with a humidification section. This would allow the above cooling method/process to be modified to include a step after sensible cooling in which the process air is humidified adiabatically to further drop the temperature of the air prior to output from the indirect evaporative cooler into a work space or building space. In some embodiments, humidification is provided by having the sensibly cooled air flowing in channels/chambers with one or both sidewalls defined by vapor permeable membranes. Particularly, the indirect section (indirect evaporative cooler) may be followed by a section that provides direct evaporative cooling, which also humidifies. This acts to further reduce the temperature of the outlet stream to provide higher sensible cooling, but such higher cooling comes at the expense of providing less latent cooling (dehumidification). Such additional cooling is shown with line 2025 in the psychrometric chart 2200 of FIG. 22, where the air is moved from an air state "2" to an air state "2.5" (with this chart 2000 explained in more detail in the following description). The particular methods or mechanisms used to provide direct evaporative cooling may be performed in many ways to practice such a cooler.

In other cases, though, a flocked surface may be used in the humidification section. For example, FIG. 16 illustrates a humidification section (or portion of such a stack/assembly) 1600 in which a separator or separation wall 1610 is provided to define sidewalls of two adjacent flow channels for process air 1614 (i.e., air that has been sensibly cooled in an upstream section of an evaporative cooler). Both sides of the wall 1610 have been covered with flocking or wicking material to provide a top wicking layer/element 1620 and a bottom wicking layer/element 1622 that are wetted (such as with water) to provide a moisture source or coolant 1630, 1632 for humidification as the air 1614 flows over the wetted surfaces of layer 1620 and to provide a heat/mass transfer to exhaust air stream 1640 (but the bottom flocking surface/layer 1622 may be omitted in some embodiments). Note, the air streams 1614 and 1640 (and 1710, 1740 below) may both be supply air.

FIG. 17 illustrates another humidification section 1700 that may be used in an indirect evaporative cooler (downstream from the sensible cooling section). In the humidification section 1700, a sensibly cooled air stream 1710 flows over a vapor permeable membrane 1714 separating the air flow 1710 (or the channel it flows within) from a flow of water or the like 1716 (or the channel in which it flows). The water flow channel or humidification source is defined on the other side by a first side/surface of a separation wall 1720. The other side of the separation wall 1720 along with a vapor permeable membrane 1730 defines a channel or chamber for flow of a coolant 1724. The humidification section 1700 further includes another or second channel or chamber in which exhaust air 1740 flows along the other side of the vapor permeable membrane 1730 and to remove heat from the evaporative cooler containing humidification section 1700.

At this point, it may be useful to describe a two-stage indirect evaporative cooler 1800 with reference to FIGS. 18-20. These figures show graphically how the cooler 1800 works on three levels: (1) FIG. 18 illustrates a heat exchange schematic showing general air, water, and desiccant flows; (2) FIG. 19 illustrates a channel pair graphic or schematic that shows an air channel pair and location of membrane and wicked water surface in the first stage and in the second stage heat and mass exchangers; and (3) FIG. 20 provides a psychrometric chart 2000 showing each air state in the cooler 1800.

FIG. 18 schematically illustrates a two-stage indirect evaporative cooler 1800 and its air flow pattern during operation. Air states are numbered in FIG. 18 and these air state numbers are repeated in FIGS. 19 and 20 (as our reference numerals to components shown in both FIGS. 18 and 19). In this discussion, air streams may be referred to or described as moving from one state to the next such as air stream "1" to "1.5" is the stream of air moving from a first air state to a second air state as the air is dehumidified.

The cooler 1800 is configured in two distinct stages or assemblies 1810 and 1850 providing a first-stage humidifier and a second-stage indirect evaporative cooler. As shown, the humidifier 1810 is made up of a number of stacks 1814 (as discussed above and shown in FIG. 19). Each stack 1814 defines a flow channel or chamber for inlet or process air 1820 to flow through the dehumidifier 1810 and be output to the second stage 1850 as dehumidified air 1822. The stacks 1814 also define flow paths for and act to contain liquid desiccant 1816 in the dehumidifier 1810 (e.g., LiCl, CaCl or the like at 35 to 40 percent by weight at a flow rate of about 0.34 gallons/minute per space cooling ton). Further each stack 1814 defines, with a pair of spaced apart wicking layers or surfaces on separation walls wicking or flowing water/coolant 1818, flow channels or pathways for exhaust air 1826 (input at air state "3") to flow through the dehumidifier and remove heat from the liquid desiccant 1816 and be output at 1828 (at air state "4").

The first-stage dehumidifier 1810 is a cross-flow heat and mass exchanger between two air streams 1820/1822 and 1826/1828. Desiccant 1816 and water 1818 flow vertically and are gravity driven. The liquid desiccant 1816 is contained by a polypropylene microporous membrane or other vapor permeable membrane (e.g., a Z-series from Celgard LLC or another distributor/manufacturer). In some implementations of cooler 1800, nozzles may be used to spray a high water flow rate (water 1818) that creates a two-phase flow of water and outdoor air in air stream 1826/1828 (air states "3" to "4"). The dehumidifier 1810 may be designed to provide a low water flow rate that is spread by wicked surfaces in contact with the air stream 1826/1828. In some embodiments, a waterside membrane may be used for controlling biological growth because it creates a barrier that blocks organisms from implanting onto wet surfaces.

The second-stage or indirect evaporative cooler 1850 is formed with an assembly or number of stacks 1854 (as shown in FIG. 19). Each stack 1854 defines a flow path or channel for dehumidified air 1822 to flow through the evaporative cooler 1850 to be output as cooled/dehumidified supply air 1860. Further, the stacks 1854 and/or manifolds or other portions of evaporative cooler 1850 define flow paths/channels for a portion of the supply air 1862 to be returned to flow through the cooler 1850 and be exhausted at 1866 after removing heat from the air stream 1822/1860. Further, the stacks 1854 provide flow paths or channels for coolant (e.g., water) 1858 such as via gravity flow in wicking layers on separation walls. The second stage 1850 is designed as a counterflow indirect evaporative cooler. In testing of some embodiments, the stage 1850 has a wet bulb effectiveness measured at 120 to 128 percent at the design mass flow rate. For both stages 1810, 1850 the water 1818, 1858 was gravity driven and provided at a low flow rate distributed across the heat transfer surfaces of stacks 1814, 1854 by a wicking material or thickness of flocking.

Top views of exemplary implementations of the stacks 1814 and 1854 of the stages 1810, 1850 are shown in FIG. 19 (with repeated components and flows labeled with like reference numbers). As shown, the first stage stack 1814 provides a pair of air flow channels: a first channel/chamber for ventilation or input air 1820 (that typically includes a volume of return air 1821 from the cooled space) and a second channel/chamber for exhaust air 1826 flowing into the page (cross flow in this example). The first channel is defined by a first wall assembly formed of a separation wall 1960 (e.g., a plastic or metal sheet) and a vapor permeable membrane 1962, which faces the air stream 1820, 1821. A flow of liquid desiccant 1816 is contained within the wall assembly provided by separator 1960 and membrane 1962. The first channel is further defined by a second wall assembly formed of a separation wall 1966 and another vapor permeable membrane 1964. Again, the membrane 1964 faces or is exposed to the air stream 1820, 1821 and a flow of liquid desiccant 1816 is provided and contained between a side/surface of separation wall 1966 and the membrane 1964.

The second or paired air flow channel of first stage stack 1814 is defined by the other/opposite side of the separation wall 1966 upon which a wicking layer 1970 is provided. The wicking layer 1970 wicks coolant/water that is directly in contact with flowing exhaust air to allow heat to be released from liquid desiccant 1816 and air stream 1820, 1821. The second air flow channel is further defined by another separation wall 1974 (which may be a top wall of a next stack), and another wicking layer 1927 of flocking or wicking material is provided on the surface/side of the separation wall 1974 facing the wicking layer 1970. Coolant such as water is wicked or gravity fed through the wicking layer 1972 as the exhaust air flows through the stack 1814.

With regard to the second stage stack 1854 of the indirect evaporative cooler 1850, a flow channel is provided for air stream 1822. This channel is provided by a side/surface of a separation wall 1980 and a spaced apart second separation wall 1982. A second flow channel is provided in stack 1854 into which a portion 1862 of the supply air 1860 is returned into the stack 1854 to remove heat and be exhausted at 1866. A second air flow channel/chamber is defined by the opposite side of separation wall 1982, which is covered with flocking/wicking material to provide a wicking layer 1984. Water or coolant is gravity fed through this layer 1984 during use of the stack 1854 in a cooler assembly. The second flow channel for air stream 1862 is further defined by a second wicking layer 1988 provided on a facing side or surface of an additional separation wall 1990. As discussed throughout, numerous first and second stage stacks 1814, 1854 would be assembled or stacked upon each other to form a two-stage cooler 1800.

FIG. 20 is a psychrometric chart 2000 illustrating the thermodynamics of the cooling processes provided by operation of the cooler 1800. The return air state is shown at 2060 while the state of the liquid desiccant is provided with line 2050 in the chart 2000. Line 2010 shows the thermodynamics as the incoming or supply air moves from air state "1" to air state "1.5" (as shown in FIGS. 18 and 19) and is dehumidified using the liquid desiccant contained in the vapor permeable membranes in the first stage dehumidifier 1810. Line 2020 illustrates thermodynamics of the dehumidified air passes through the second stage indirect evaporative cooler 1850 and moves from air state "1.5" to air state "2" and is subject to sensible cooling. Line 2030 shows the thermodynamic properties of the return air 1862 that is passed back through the second-stage cooler 1850 and is then output as purge or exhaust air 1866. Line 2040 illustrates thermodynamic properties of exhaust air stream 1826 to 1828 (e.g., outside air) as it passes through the first-stage dehumidifier 1810. As shown in the chart 1800, the air to be supplied to a building space was dehumidified and was also reduced from an original temperature between 80 and 85° F. to about 60° F., which is useful for cooling many residential and commercial spaces.

The cooler 1800 may be modified by adding a direct evaporative section or stage as shown in FIG. 21. In the cooler of FIG. 21, the cooled supply air 1860 from the second stage 1854 is output to the direct evaporative stage 1999 where the air 1860 undergoes humidification and further cooling before being discharged at 1997 in air state "2.5." As shown with the psychrometric chart 2200 of FIG. 22, direct evaporative cooling may be provided as shown with line 2025 to further reduce the temperature of the outlet air stream (but, as shown, the air stream is also humidified) as the air moves from air state "2" to air state "2.5." The direct evaporative stage may be integrated into the second stage device 1854 or provides as a separate device (e.g., with reference to FIG. 18, a separate heat and mass exchanger in the cooler 1800 downstream of evaporative cooler 1850 or be integrated into evaporative cooler 1850).

As shown, the supply air 1860 flows in channels defined by separation walls 1991, 1993, and 1995 with wicking material or flocked surfaces 1992, 1994 facing into each channel. In this way, a water may be caused to flow next to the air 1860 to provide humidification to the output supply air 1997 (cooled and humidified to air state "2.5" as shown in FIG. 22). Air 1997 is colder than air 1860 from the second state 1854, and less energy is required to provide a desired level of cooling.

The cooler 1800 may be assembled and implemented in a variety of ways to practice the cooling methods and techniques described herein, but it may be useful to describe one tested assembly or cooler. In the first-stage, flutes were created by extrusion to form the coolant airstream 1826 to 1828 (state "3" to state "4"). Water 1818 was distributed via flow nozzles at the top of the dehumidifier 1810 (e.g., in the airstream 1826 plenum) and mixed with airstream 1826 to 1828, which ran vertically downward. Some water evaporated as it traveled through the dehumidifier 1810, but most was collected at the bottom of the airstream 1828 plenum. Louvers in this plenum were used to separate the water droplets from the airstream. Because this design did not have a mechanism to hold up the water internal to the flutes (e.g., wicked surfaces), this configuration uses a water flow rate that is significantly higher than the water evaporation rate. Thus, a water reservoir and pump were used to return the water from the collection sump to the top flow nozzles.

The unbacked vapor permeable membrane was welded to the flutes/extrusions. A liquid manifold distributed desiccant to the space between the membrane and the flutes/extrusions. Air gaps on airstream 1820 to 1822 (air state "1" to air state "1.5") were maintained by strips of spacers with the extruded flutes oriented parallel to the airflow. The design also incorporated spacers that mix the airstream to enhance heat and mass transfer. Flutes were used to form the channels for airstream 1822 to 1860 (air state "1.5" to air state "2"). A nylon wick was applied to the outer walls of the separation wall/plastic sheets. These subassemblies were then stacked with spacers between each to form the channels for air flow 1862 to 1866 (air state "2" to air state "5"). A low flow of water 1858 was distributed into the second-stage channels from the top. The nylon wick had sufficient water upkeep to allow this flow rate to be marginally above the water evaporation rate. Thus, a solenoid valve controlling domestic cold water may be used to distribute water. Purge water was collected at the bottom of the plenum of air stream 1866, at which point it was directed to a drain.

Wicked surfaces provide a number of advantages for the indirect evaporative coolers described herein. The wicking ensures that the walls are fully wetted and that there is no lost evaporation area. The water feed rate can be held to a factor of 1.25 to 2 times that of the evaporation rate. This technique allows for "once-through" water use. The water that drains off the heat and mass exchanger is concentrated with minerals and can then be drained away. A sump and pumping system are not required, which improves energy performance and eliminates sump-borne biological growth. A simple controller can periodically use fresh (low concentration) water to rinse the heat and mass exchanger (such as cooler 1800) and clear any built-up minerals. Air streams 1822 to 1860 and 1862 to 1866 are in counterflow in the second-stage 1850. A sensitivity analysis showed that the cooling effectiveness could be reduced by as much as 20 percent if proper counterflow was not achieved. Air stream 1822 to 1860 flowed straight, through extruded flutes, but airstream 1862 to 1866 used a 90-degree turn before exiting the second stage 1850. Computational fluid dynamics software may be used design an air restrictor to ensure proper counterflow of air stream 1862 to 1866.

Likewise, the stacks including the membranes and wicking material may be formed in a variety of ways to implement a mass and heat exchanger of the present description (such as cooler 1800). The construction of one prototype revolved around laminated layers of polyethylene terephthalate (PET) plastic that were adhered with layers of acrylic pressure-sensitive adhesive. Although this assembly method may not easily be scaled to high-volume manufacturing, the achievable geometries are nearly ideal and, therefore, appropriate for prototypes. This enabled the inventors to create a prototype with parallel plate geometry and to include airside turbulators to enhance heat and mass transfer on airstreams. Another prototype was built using layers of extruded polypropylene (PP). It is likely that formed aluminum sheets may be used to create a parallel plate structure to implement a cooler described herein. For example, the aluminum may be corrugated to form a wavy flow channel, which would increase heat transfer by the waviness of the channel (which promotes mixing of the air stream and impingement of the air into the separator plate wall) and also act to reinforce the structure by giving the plates increased rigidity. Such an arrangement may work better in the second stage where there is no desiccant (since the desiccant may corrode the aluminum).

For the first-stage 1810, the laminated layers enabled the use of wicked surfaces in the air stream 1826 to 1828 channels. For the spacer, an off-the-shelf expanded aluminum grating used, and the spacer was used in channels for air stream 1820 to 1822 and air stream 1826 to 1828. The design of the stacks such as stack 1814 used expanded polypropylene hydrophobic membrane from backed with a nonwoven polypropylene fabric to add strength. The backing reduces vapor diffusion through the membrane but increases tear resistance. The backing was oriented to the airside gap, where tears can originate from abrasion by foreign objects or the aluminum spacer. A desiccant manifold was developed that used laminated layers of plastic and adhesive to effectively and evenly distribute liquid desiccant behind the membrane. The second stage 1850 used laminated construction but, with minimal spacers to create laminar flow, used parallel plate air channels. The design used strips as airflow spacers and wicked surfaces on the wet side of the heat and mass exchanger 1800.

With the above discussion in mind, it may be useful to turn to a number of other types of IECs and use of heat transfer enhancements in IECs to improve the IECs (e.g., allow smaller IECs to be used to handle a particular cooling load). For example, IECs have been manufactured and tested that use plastic separator plates. These "plastic" IECs often have been configured for counterflow and included an air-to-air heat exchanger (AAHX), where one air stream is in direct contact with the dry air surfaces and a second air stream is in contact with a surface that is wetted with liquid coolant (e.g., refrigerant or water).

A plastic separator plate was used to provide a dividing wall between these two air streams such that the plastic separator plate had a dry side and a wet side. The inventors recognized that based on the above teaching that the wet side may be provided with wicking material or flocked surfaces on one side/surface (the wet side) of the separator plate and arranged to face into one of the air flow channels of the IEC. The results of testing of such a "plastic", counterflow IEC showed that at nominal air flow the IEC was able to cool the air considerably (or desirably) while having an effectiveness of 125 percent (as measured by wet bulb).

The inventors assert that the effectiveness of the IEC using plastic separator plates (or plates made of other lower thermal conductivity materials) can be improved through the use of heat transfer enhancements as taught herein (e.g., turbulators on the dry side of the plate). Further, though, the inventors propose a similar device to that tested (i.e., an IEC with an AAHX) that is built from sheet metal, such as aluminum sheets for the separator plates, rather than plastic sheets. The metal separator plates may also be modified to include heat transfer enhancements to improve the IEC effectiveness (e.g., the same or differing enhancements as would be used for plastic separator plates).

For example, aluminum has high thermal conductivity compared to most if not all plastics that may be used for separator plates of an IEC (i.e., thermal conductivity of 237 W/m-k for aluminum compared with 0.15 W/m-k for polypropylene). This high thermal conductivity provides improved heat transfer in the IEC and also allows for a number of unique heat transfer enhancements in which the aluminum or other metal of the plate body can be modified or configured to act like fins on the dry side of the separator plate (in the dry airstream channel(s) of the IEC).

In one IEC implementation, heat transfer enhancements are provided in the form of slit fins configured provide a bridge member/element extending into the air stream. In other words, the fin body bridges over a hole or gap cut into the separator plate to form the slit fin. Such a heat transfer enhancement may be implemented as shown in FIG. 23. FIG. 23 illustrates a separator plate 2310 that may be used in an IEC using an AAHX. The separator plate 2310 has a planar or sheet-type body 2312 with a first side or surface 2314 and a second side or surface 2315 opposite the first side/surface 2314. In practice, the first side 2314 may be the dry side of the IEC while the second side 2315 may be used as the wet side of the IEC. The body 2312 may be formed of an aluminum or other metal sheet, such as a sheet with a thickness in the range of about 0.005 to 0.015 inches or another thickness useful in fabricating an IEC (e.g., providing the cooling coil).

To improve heat transfer, the body 2312 is modified to have a slit fin geometry. As shown, the slit fins (such as fin 2324) may be provided in an offset or staggered pattern with columns of the fins offset by a distance, $d_{col}$, as shown between column axes 2322, 2342. Further, the rows 2320, 2340 may be offset a distance, $d_{row}$, as shown between row axes 2321, 2341. The rows 2320, 2340 of the slit fins or bridge members 2324 are provided on the dry side 2314 of the separator plate 2310. During use air flow 2305 is provided through the IEC, and this airstream 2305 flows both through or under the bridge members or fins 2324 as shown at 2307 and also over and adjacent the fins 2324.

With reference to fin 2324, each fin 2324 may be formed by slitting the metal of the body 2312 of the plate 2310 along two parallel lines (as shown with hole or gap 2326), and fin body 2326 is pressed outward from the body 2312 of the plate 2312. This forming or pressing may provide a bridge-shaped member or fin 2324 as shown with a body 2326 formed of a first leg 2327, an intermediary or bridging element 2328, and a second leg 2329. In practice, the fin body 2326 may also be more arcuate in shape. As shown, though, the legs 2327 and 2329 may be pressed out at angles ranging from 30 to 45 degrees or the like from the surface/side 2314 of the plate body 2312. A hole or gap 2326 is formed as material used to form the bridge member 2324 is extended outward a distance/height from the surface 2312. The dimensions of the fin body 2326 may be varied widely to practice the separator plate 2310 with some exemplary implementations having a length of 0.25 to 1 inches, a width of 0.15 to 0.5 inches, and a height of 0.1 to 0.5 inches.

As discussed above, each of the bridge-type features or members 2324 creates an extended surface that transfers heat from the bulk separator plate material (i.e., the plate body 2312) through the extended surface (legs 2327, 2329) provided by the plurality of bridge-type members 2324 in rows 2320, 2340 and into the air stream 2307, 2309. Extending the surface 2314 of the plate 2312 out into the flowing air stream 2305 with the bridge elements 2324 (formed by slitting the plate body 2312) provides two effects that increase heat transfer. First, the bridge member 2324 in effect reaches out to the air 2307, 2309 that is, in general, the hottest (at the highest temperatures), and, as a result, the bridge member 2324 increases the local temperature difference between the air and the extended surface of the bridge member (or slit fin) 2324. Second, the air flow boundary layer is re-started at the beginning of each slit fin or bridge member 2324 at the leading edge of the fin/bridge member (or the extended plate surface provided in the air stream). Such re-starting of the boundary layer increase heat transfer due to the high air speed and thermal gradients that are produced by this heat transfer enhancement feature provided by bridge member 2324.

With the use of the slit fins such as fin 2324, a hole or gap 2326 is formed in the plate body 2312 where the slit fin or tab fin body 2328 is cut from the material of the plate body 2312. Hence, the use of such heat transfer enhancements is likely counterintuitive to many in the cooling arts within a mass and heat exchanger with a wet side. However, FIGS. 24A and 24B illustrate to techniques that may be used within an IEC (e.g., within the AAHX) to block air 2307 from flowing or transpiring from the dry side 2314 of the plate 2310 to the opposite side or wet side 2315. FIG. 24A shows a separator plate assembly 2450 that includes the separator plate body 2312 with a plurality of slit fins 2324 extending outward from the dry side 2314. In this manner, the fin 2324 including the legs 2327, 2329 and bridging element 2328 are positioned within the air flows 2307, 2309 to improve heat transfer through the plate body 2312.

With the partial cross sectional view provided in FIG. 24A, it can be seen that air flow 2307 would be able to pass through the plate body 2312 unless a seal was provided to block air from transpiring to the wet side 2315. To this end, the separator plate assembly 2450 includes an adhesive layer 2452 with a first side attached to the side/surface 2315 of the plate body 2312 opposite the dry side/surface 2314 and the material of the fin 2324. The adhesive layer may be a sheet or continuous layer or film of adhesive that not only abuts the surface 2315 but also extends over and covers the holes in plate body 2312 to provide an airtight (or substantially airtight) seal at the fins/bridge members 2324.

In some embodiments of the assembly 2450, no additional layers or materials are provided. However, as shown in FIG. 24A, it may be desirable in many applications to provide a wicking layer 2456 on the adhesive layer 2452 opposite the separator plate body 2312. As discussed throughout this description, the wicking layer 2456 may be used during operation of an IEC or AAHX with the assembly 2450 to wick a liquid coolant (such as water) along the surface 2315 (wet side of the separator plate), and an airstream or flow of air 2451 may be directed over the wicking layer 2456. The layer 2456 provides a hydrophilic layer for spreading the coolant (e.g., refrigerant) on the wet side 2315 of the IEC, while the adhesive layer 2452 creates the barrier to prevent air flow through the holes. The wicking layer 2456 may be formed of fibers such as flocking or a woven or unwoven fabric applied to and affixed to the adhesive layer 2452. In this way, the adhesive material of layer 2452 acts to bind itself to the surface/side 2315 of the plate body 2312 and also to adhere the flocking material 2456 to the separator plate body 2312.

FIG. 24B provides a partial cross sectional view of another separator plate assembly 2460 that may be used in an IEC fabricated according to the present description. The assembly 2460 is similar in configuration to assembly 2450 with similar slit fins 2324 creating holes in the separator plate body 2312. However, the sealing of the holes is provided in assembly 2460 with a support layer 2570 upon which the adhesive layer 2452 is applied on one side and the wicking layer 2456 is provided on the opposite or air side of the support layer 2570.

In this embodiment, the adhesive layer 2452 may take the form of a pressure-activated adhesive that is activated when the support layer 2570 is pressed against the wet side 2315 of the plate body 2312. Other adhesives may also be used, and the support layer 2570 may be a thin sheet or layer of plastic or metal or may even be provided as a foil. Again, the wicking layer 2456 may be fibers such as flocking or fabric applied (e.g., sprayed) onto the support layer 2570 (with additional adhesive if necessary, although this is not shown) on its exposed side/surface. During use in an IEC, an airstream or flow of air 2451 would be directed over the wicking layer 2456 to exchange heat with a coolant flowing therein, which in turn would exchange heat with air flow 2307, 2309 via the separator plate body 2312 and its heat transfer enhancements 2324.

FIG. 25 illustrates a portion or subassembly of an IEC 2520 that is configured to provide alternating air flow channels of an AAHX, e.g., dry side-wet side-dry side and so on. As shown, four separator plates 2522, 2524, 2526, 2528 have been modified or fabricated with heat transfer enhancements, i.e., slit fins, and have been stacked in a spaced-apart manner to defined three air flow channels. With reference to adjacent plates 2526 and 2528, a dry air flow channel has been defined between these two plates 2526 and 2528 by their dry sides/surfaces 2532, 2542 (which are facing each other in the assembly 2520).

On plate 2526, a plurality of slit fins 2534 are formed and extend outward from surface 2532 toward the adjacent plate 2528 or into the dry air flow channel. The opposite side or wet side 2533 of the separator plate 2526 contains or has holes/gaps 2535 associated with each fin 2534. Although not shown, the wet side 2533 would likely be sealed to block air flow from side 2532 such as shown in FIG. 24A or 24B with an adhesive or other sealing layer. Likewise, on separator plate 2528, a plurality of slit fins 2544 are formed and extend outward from surface or dry side 2542 toward the adjacent plate 2526 or into the dry air flow channel formed between plates 2526, 2528. The opposite or wet side 2543 of the separator plate 2528 contains or has holes/gaps 2545, which (although not shown) would be sealed to block air flow from side 2542 to the wet side 2543 (which may be covered with an adhesive layer and a wicking layer or thickness of flocking or woven/unwoven fabric).

In some cases, IEC portions or assemblies 2520 assembly may involve forming separator plate stock by processing aluminum or other metal sheets to provide the staggered slit fins (as discussed with reference to FIG. 23 and shown in plates 2522, 2524, 2526, 2628). This slit fin stock can then be stacked as shown in FIG. 25 with the finned or wet sides facing each other in a repeating pattern to provide alternating dry air flow channels (which include the extended plate surfaces for heat transfer provided by the slit fins) and wet air flow channels (which may also include a pair of wicked layers on the sides of the plates with sealed holes to provide a flow path/plane for liquid coolant such as water or refrigerant).

The slit fins or heat transfer enhancements protrude into one set of channels so as to provide two channel types that come in pair in IEC subassembly 2520. One set of channels includes the heat transfer enhancements such as slit fins and one has none. This arrangement would have, therefore, one set of channels that have a local heat transfer coefficient based on projected plate area of about 2 to 3 times that of laminar. To make the IEC subassembly 2520 a counterflow evaporative cooler, the holes created by the slits are sealed. Also, a wicked surface may be created or provided on the non-slit fin channel. This may be accomplished by wrapping the non-slit fin channel with a sheet of thin plastic and/or adhering the plastic to the separator plates (e.g., aluminum sheets).

FIG. 26 illustrates another portion or assembly of an IEC 2610 that is used to provide side-by-side air flow channels for use in a mass and heat transfer assembly such as an AAHX of an IEC. The IEC assembly 2610 includes a pair of spaced apart separator plates 2612 and 2632 between which a dry side air flow channel 2650 is defined. During operations, product air flow 2605 is caused to flow in the channel 2650 while exhaust air flow 2607, 2608 is caused to flow in the adjacent flow channels (wet side of plates 2612, 2632) defined in part by separator plates 2612, 2632 (and other assemblies 2610 not shown in FIG. 26).

Separator plate 2612 is shown to have a first or dry side 2613 upon which a number of heat transfer enhancements 2614 have been formed, and, as shown, these enhancements 2614 may take the form of slit fins extending a distance into channel 2650. The separator plate 2612 has a second or wet side opposite the dry side 2613 upon which a wicking surface 2618 has been formed or provided such as by providing flocking or fabric upon an adhesive layer or upon a plastic or metal sheet that is applied by adhesive to the plate 2612 (with the adhesive and/or support layer provided by the plastic/metal sheet sealing holes associated with the heat transfer enhancements 2612. During operations, the exhaust air flow 2608 is directed over the wicking surface 2618.

The separator plate 2632 is likewise shown to have a first or dry side 2633 upon which a number of heat transfer enhancements 2634 have been provided or formed such as slit fins as discussed with reference to FIG. 23. The enhancements or fins 2634 extend outward a distance into the channel 2650 toward the facing surface 2613 of the adjacent or paired plate 2612. On the second or wet side of the plate 2632 a wicking surface 2638 is provided, which may be formed with an adhesive layer used to seal the holes associated with the heat transfer enhancements 2634 and to attach flocking/fabric and, in some cases, a plastic, metal, or other support layer to the separator plate 2632. During operation of the IEC with assembly 2610, exhaust air flow 2607 may be caused to flow over the wicking surface 2638 while product air flow 2605 flows through the channel 2650 over the surface/side 2633 of separator plate 2632 (in counterflow as shown in FIG. 26 or other flow arrangements may be used with IEC assembly 2610).

The channel 2650 may be sealed from flow of liquid coolant (e.g., water) as part of the fabrication of the assembly 2610. Particularly, a single sheet of material such as aluminum may be used to form or provide the two separator plates 2612, 2632. The single sheet may then be bent, e.g., at its midsection or region, to place the two separator plates 2612, 2632 is spaced apart and, in some cases, substantially parallel positions relative to each other as shown in FIG. 26. Further, this bending or forming action creates an end wall or cap 2620 along one end of the channel 2650. By placing this at the upper end or edge of the assembly 2610 in an IEC, liquid coolant 2609 can then be gravity fed over the assembly 2610 to flow in the wicking surfaces 2618, 2638 and over the end cap or wall 2620. Coolant 2609 will not flow into the channel 2650 or on the dry sides 2614, 2633 of the two separator plates 2612, 2632, and no or little additional sealing components are needed in the IEC using the assembly 2610.

In an IEC, two or more of the assemblies 2610 may then be paired to create a stack of alternating wet and dry channels. To this end, spacing between adjacent wet sides of the separator plates of such pairs of assemblies 2610 may be provided by two or more spacers (not shown). The spacers may be placed in abutting contact with the wicking surfaces/layers, and the bodies of the spacers may be narrow (e.g., widths of 1 to 3 inches or the like) and thin (selected to, in part, provide/define the wet side channel thickness such as 2 to 6 millimeters or more) and extend along all or a fraction of the height of the separator plates. The bodies of the spacers may be porous to allow air flow (e.g., exhaust air flow 2607, 2608) through the spacers. For example, an IEC may include two or more of the IEC assemblies 2610 spaced apart by strips of corrugated plastic (e.g., fluted plastic sheets available from Coroplast or other manufacturers/distributors) or other porous material that may be arranged with its channels or flutes aligned or oriented with air flow paths in the wet side channel.

IECs with a counterflow air arrangement may be achieved by closing off the wet channel. This may involve placing horizontal spacers at the top and bottom of the stack or by forming the separator plate at the product air inlet side. At the product air outlet, a slip stream of air can be sent or directed into the wet channel. A vertical spacer, with no holes, may be provided at the ends of the wet channel to direct exhaust air through an air outlet (e.g., one formed in a space/gap in a bottom one of the horizontal spacers).

In some cases, heat transfer enhancement is provided with a separator plate that is non-planar or has a non-planar cross sectional shape. For example, FIG. 27 illustrate a top view of an IEC assembly 2710 (e.g., with a top cover removed). During operations, product air 2705 is provided at an inlet to the dry channels of the assembly 2710 such as between side-by-side separator plates 2720 and 2730. After cooling, the air 2707 is ejected at an outlet to these channels of the assembly 2710, with a slip stream of exhaust air 2709 directed into wet channels of the assembly 2710 (e.g., to flow over wicking surfaces 2724, 2734 on separator plates 2720, 2730 in which coolant is flowing).

As shown, the dry sides/surfaces 2722, 2732 of the two side-by-side separator plates 2720, 2730 are spaced apart to define a flow channel for the inlet airstream 2705. However, as compared with other dry side surfaces, the surfaces 2722, 2732 are not planar and neither are the wet side surfaces providing the wicking layers 2724, 2734. The surfaces 2722, 2732, 2724, 2734 have alternating bumps and dips (peaks and valleys), and this is achieved by forming the body of the separator plates 2720, 2730 to have a wavy or sinusoidal cross sectional shape. This surface shape disrupts flow such that heat transfer is enhanced in an IEC including the assembly 2710. Further, the improved heat transfer is provided on both sides (dry and also wet sides) of each of the separator plates 2720, 2730 and not just on the dry side as with other enhancements due to the disruption of the flow of air 2705 and 2709.

As the assembly 2710 shows, heat transfer enhancements can be provided without slits or creating holes in a separator plate. FIG. 28 illustrates another such example with a separator plate 2810 with a separator body 2812, a first surface (dry side) 2814, and a second surface (wet side) 2816. When the plate 2810 is included in an IEC and the IEC is operated, air flow 2805 would be directed over the surface 2814 (as well as surface 2816). Heat transfer enhancements are provided in the plate 2810 in the form of a plurality of raised bumps or dimples 2820. The dimples 2820 are formed so as to not form holes in the body 2812 but to extend a portion of the material of the body 2812 away from the dry side surface 2814 while forming divots or recessed surfaces on the wet side surface 2816. The bumps or dimpled fins 2820 may take many forms to provide heat transfer enhancement and are selected to make the surface 2814 rough or irregular so as to disrupt air flow 2805 as well as placing portions of the material of body 2812 in hotter regions of the air flow 2805.

Further, the fins or heat transfer enhancements do not need to be formed from the material of the separator plates. For example, the enhancements may be provided by material or objects placed between two adjacent separator plates (within the dry channel). In one implementation, heat transfer enhancement involve placing a metal foam insert(s) or the like between the dry side/surfaces of two adjacent separator plates such that at least portions of the insert are in contact with the separator plates. The use of such an insert may resist air flow within the dry channel.

FIG. 29 illustrates use of an insertable heat transfer enhancement in the assembly 2910. The assembly 2910 includes a top separator plate 2912 and a bottom separator plate 2916. Both plates 2912, 2916 includes wicked surfaces 2914 and 2918, and the plates 2912, 2916 are arranged to be parallel, to be spaced apart a distance to create a channel (dry channel), and to have wicked surfaces 2914, 2918 facing away from each other. The plates 2912, 2916 also include dry side surfaces/sides 2913, 2919 that are facing each other and define the channel (dry channel), and, when the assembly 2910 is included in an operating IEC, product air flow 2905 is caused to flow within the channel between sides/surfaces 2913, 2919 of the two separator plates 2912, 2916. Then, the air 2907 flows out of the assembly 2910 while a portion (shown at 2909) is returned/redirected to flow over the wicked (and wetted) surfaces 2914, 2918.

The heat transfer enhancements are insertable in the assembly 2910. Particularly, the assembly 2910 includes a heat transfer enhancement insert (or heat transfer enhancement assembly) 2930 that is sandwiched between the two separator plates 2912, 2916. Particularly, the insert or assembly 2930 may take the form (as shown) of a plurality of offset strip fins 2935, which are configured to define numerous channels/paths for air flow 2905. The upper edges of the strip fins 2935 typically are in contact or abut the surface 2913 of top separator plate 2912 while the lower edges of the strip fins 2935 are in contact or abut the surface 2919 of the bottom separator plate 2916 such that heat is transferred from the air 2905 via the fins 2935 and plates 2912, 2916 (which may be aluminum or other metal sheets in some cases). In other words, the fins 2935 have a height equal to the height of the channel formed between the two surfaces/sides 2913, 2919. The use of insert 2930 of offset fins 2935 allows heat transfer to be improved for separator plates 2912, 2916 without requiring holes to be punched in the plates 2912, 2916 to form fins.

In addition to the slit fins described with reference to FIG. 23, a variety of other fin shapes and configurations may be used to provide heat transfer enhancements on a separator plate. For example, FIG. 30 illustrates a separator plate 3010 that has been fabricated or modified to include heat transfer enhancements in the form of a plurality of tabbed fins 3020. The plate 3010 includes a body 3012 with a first side/surface 3014 (e.g., a dry side that during use in an IEC would be exposed to product air 3005 that would be output as shown at 3007) and with a second side/surface 3015 (e.g., a wet side that may include a sealing layer of adhesive or adhesive and support material and a wicking layer that would be wetted with coolant as exhaust air 3009 is caused to flow over the surface 3015).

Each tabbed fin or tab 3020 includes a body 3022 that may be rectangular in shape (as shown) and a hole or void 3024 in the plate body 3012 is formed as the tab 3020 is created. For example, three sides of the tab body 3022 are slit through plate body 3012, and the tab body 3022 can then be bent away from the material of the plate body 3012 (such as to be 60 degree to orthogonal relative to the plane of the surface 3014) to extend into the channel and/or air flow 3005. The tabbed fin 3020 conducts heat and creates higher thermal gradients. The tabbed fins 3020 may be staggered or offset on the surface 3014 relative to the air flow 3005 or its flow direction so as to further disrupt air flow and increase heat transfer.

In some cases, IECs are provided that do not necessarily rely upon the thermal conductivity of the separator plate being relatively high to achieve improvements in heat transfer. For example, the separator plates may be made of a metal such as aluminum or of a low thermal conductivity material such as a plastic (e.g., polypropylene or the like). In these IECs, heat transfer enhancements may be provided on the dry side of each separator plates in the form of turbulators. These may be V-shaped vortex generators in the form of a triangular-shaped tab (or rectangular in some cases) that is cut or slit from the separator plate (two sides slits defining two sides of a triangular tab body).

The tabs are positioned in the plate surface (dry side) and bent away from the plate surface so as to be formed with their bodies at an angle relative to air flow such as 20 to 45 degrees to the planar plate surface (with 30 degrees to the airflow used in some implementations). Each turbulator may have a profile in the air flow channel (relative to the direction of the airstream in the dry channel) that is 0.1 to 0.5 inches with 0.25 inch turbulator used in some implementations. Each turbulator or angled tab acts to create vortex flow downstream from the tab body.

The orientation of the tab bodies may be alternated in each row (orthogonal to the direction of the air flow) so as to create vortices in opposite directions (one clockwise while the adjacent turbulator creates a counterclockwise vortex). Such flow creates mixing in the air flow in the dry channel, which results in higher thermal gradients in the air flow and increases heat transfer to the separator plate containing the turbulators or angled fins. Rows of the turbulators may be repeated along the length of the channel on the surfaces of the separator plates (e.g., repeat every 10 to 30 hydraulic diameters or the like).

The slit fins of FIG. 23 generally only redirect air flow in a one-dimensional way as the air flows under the bridge member (or body of the fin extending into the channel). In some cases, it may be desirable to provide slit fins that are formed to be asymmetrically conical. A slit fin with an asymmetrically conical body acts, when included as heat transfer enhancements on a separator plate within an IEC, to redirect air flow in two dimensions. Other features of the IEC such as a sealing layer used to seal voids or holes associated with each slit fin would be the same for these separator plates as well as folding or bending of a single sheet to form two separator plates with an adjoining end cap or wall.

At this point, it may be useful to illustrate an exemplary asymmetrically conical slit fin. FIGS. 31A and 31B illustrate a top and side view of a portion of a separator plate 3100 with a heat transfer enhancement in the form of an asymmetrical arched conical fin 3120. The fin 3120 is formed in the body 3110 of the plate 3100 by slitting or cutting the asymmetrical conical shape of the fin body 3122 and pressing or arching the fin body 3122 outward from the plate body 3110 to extend away from the side/surface (dry side) 3112 of the separator plate 3100. This leaves a void or hole 3123 that would be sealed as discussed above (e.g., by application of an adhesive layer on surface 3114).

As shown, a leading edge 3124 of the fin 3120 is more arcuate (has a greater chord length) than a trailing edge 3126 (or these may be reversed in some cases) such that the body 3122 is asymmetric. Further, the leading edge 3124 has a first height, $h_1$, that is greater than the height, $h_2$, of the trailing edge 3126. This configuration causes the air flow 3105 entering or flowing through the body 3122 of the fin 3120 to be redirected in two dimensions. In other words, air is directed from mid channel to the channel boundary when the higher portion of the fin faces upstream and the leading edge height, $h_2$, is about one half the height of the channel. In some embodiments, the opening area of the fin 3120 at the leading edge 3124 is about equal to the opening area of the fin 3120 at the trailing edge 3126 (i.e., $A_1=A_2$ to provide an asymmetrical fin 3120).

The use of heat transfer enhancements or enhancement features in an indirect evaporative cooler can significantly improve heat transfer. The enhancement features may be arranged in a manner to create an IEC that can produce air with temperature very close to the dew point of the incoming wet air stream. Some of the techniques for providing the enhancement features are not readily apparent to those practiced in the arts because it involves creating holes or voids in the heat exchanger separator plates. These holes or voids, though, are then covered or sealed to prevent or at least limit transpiration of air through the separator plates.

When the heat transfer enhancements are used in IECs, the fins and other enhancements may protrude from the main plate surface (e.g., aluminum sheet) into the dry channels, which addresses problems of low heat transfer coefficients in these channels. When the heat transfer enhancements involve providing wavy or sinusoidal "fins" or non-planar plate surfaces defining the air flow channels, heat transfer is increased in the dry channels and mass transfer is increased in the wet channels. The effects of improved heat and mass transfer coefficients associated with use of the taught heat transfer enhancements improve the efficiency, size, and cost of an IEC that includes such heat transfer enhancements on its separator plates.

While a number of exemplary aspects and embodiments have been discussed above, those of skill in the art will recognize certain modifications, permutations, additions, and sub-combinations thereof. It is therefore intended that the following appended claims and claims hereafter introduced are interpreted to include modifications, permutations, additions, and sub-combinations to the exemplary aspects and embodiments discussed above as are within their true spirit and scope.

What is claimed is:

1. A separator plate assembly for use in an indirect evaporative cooler (IEC), comprising:
    a separator plate with a body having a first surface for use in defining and contacting a dry channel in the IEC and a second surface opposite the first surface for use in defining a wet channel in the IEC; and
    heat transfer enhancements provided on the first surface, whereby the heat transfer enhancements comprise a pattern of features structured to at least periodically disrupt airflow traveling across the first surface within the dry channel.

2. The assembly of claim 1, wherein the heat transfer enhancements include a plurality of slit fins with bodies extending outward from the first surface of separator plate.

3. The assembly of claim 2, wherein the slit fins are selected from the group of fins consisting of: bridge fins, tabbed fins, asymmetrical conical fins, and vortex-generating fins.

4. The assembly of claim 2, wherein the separator plate includes a hole extending through the separator plate body proximate to each of the slit fins and the separator plate assembly further includes a sealing layer applied to the second surface of the separator plate to block air flow through the holes.

5. The assembly of claim 4, wherein the sealing layer comprises a thickness of adhesive adhered to the second surface of the separator plate.

6. The assembly of claim 5, further comprising a layer of wicking material applied to a surface of the sealing layer opposite the second surface of the separator plate.

7. The assembly of claim 6, further comprising a support member sandwiched between the layer of wicking material and the sealing layer, the support member comprising at least one of a sheet of plastic, a sheet of metal, and a foil member.

8. The assembly of claim 1, wherein heat transfer enhancements include shaping the body of the separator plate to have a non-planar cross sectional shape whereby at least one of the first and second surfaces has a wavy or sinusoidal shape.

9. An indirect evaporative cooler for use with a liquid desiccant dehumidifier, comprising:
    a first separator plate with first and second surfaces;
    a second separator plate with first and second surfaces, wherein the first and second separator plates are arranged with the first surfaces spaced apart and facing each other to define an air flow channel between the first and second separator plates, and wherein the first surfaces contact the air flow channel; and heat transfer enhancements provided within the air flow channel.

10. The cooler of claim 9, wherein the heat transfer enhancements comprise slit fins extending outward from the first surfaces into the air flow channel.

11. The cooler of claim 10, wherein the slit fins are selected from the group of fins consisting of: bridge fins, tabbed fins, asymmetrical conical fins, and vortex-generating fins.

12. The cooler of claim 10, further comprising a sealing layer covering each of the second surfaces to block air flow from the air flow channel through the first and second separator plates and a wicking layer attached to each of the sealing layers opposite the first and second separator plates.

13. The cooler of claim 12, wherein the sealing layer comprises a layer of adhesive.

14. The cooler of claim 12, further including an end cap sealing the air flow channel at one end and extending between the first and second separator plates, whereby liquid coolant directed to flow over the end cap and into the wicking layers is blocked from flowing into the air flow channel.

15. The cooler of claim 14, wherein the end cap, the first separator plate, and the second separator plate are integrally formed from a metal sheet.

16. The cooler of claim 14, wherein the end cap comprises a portion of the wicking layer extending between the first and second separator plates.

17. The cooler of claim 9, wherein the heat transfer enhancements comprise an insert of offset strip fins sandwiched between the first and second separator plates.

18. The cooler of claim 9, wherein the heat transfer enhancements include wavy or sine fins extending from at least the first surfaces.

19. An indirect evaporative cooler, comprising:
a separator plate with a planar metal body with first and second surfaces;
on the first surface, a plurality of fin bodies extending outward from the planar metal body and a plurality of holes associated with each of the fin bodies extending through the planar metal body;
a sealing layer applied to the second surface of the planar metal body, the sealing layer adapted to block air flow through the holes in the planar metal body; and
a layer of wicking material applied to the sealing layer.

20. The indirect evaporative cooler of claim 19, wherein the fin bodies comprise bridge shaped members arranged to be parallel to each other, to be in staggered rows on the first surface, and to be orthogonal to a flow direction of air across the first surface in the indirect evaporative cooler.

21. The indirect evaporative cooler of claim 19, wherein the fin bodies include pairs of turbulators adapted to create opposite direction vortices in air flowing over the first surface.

* * * * *